United States Patent
Obata et al.

(10) Patent No.: US 10,492,510 B2
(45) Date of Patent: Dec. 3, 2019

(54) CELLULOSE COMPOSITE

(71) Applicant: ASAHI KASEI KABUSHIKI KAISHA, Tokyo (JP)

(72) Inventors: Haruko Obata, Tokyo (JP); Naoaki Yamasaki, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/566,099

(22) PCT Filed: Apr. 13, 2016

(86) PCT No.: PCT/JP2016/061880
§ 371 (c)(1),
(2) Date: Oct. 12, 2017

(87) PCT Pub. No.: WO2016/167269
PCT Pub. Date: Oct. 20, 2016

(65) Prior Publication Data
US 2018/0110235 A1    Apr. 26, 2018

(30) Foreign Application Priority Data

Apr. 17, 2015 (JP) .................... 2015-084972

(51) Int. Cl.
| | | |
|---|---|---|
| A23G 1/56 | (2006.01) | |
| A23L 2/62 | (2006.01) | |
| C08K 3/20 | (2006.01) | |
| C08L 1/02 | (2006.01) | |
| C08L 1/32 | (2006.01) | |
| A23L 29/00 | (2016.01) | |
| C08L 1/28 | (2006.01) | |
| A23L 25/00 | (2016.01) | |
| A23L 29/262 | (2016.01) | |
| A23C 9/156 | (2006.01) | |
| C08J 3/00 | (2006.01) | |

(52) U.S. Cl.
CPC ............ A23G 1/56 (2013.01); A23C 9/156 (2013.01); A23L 2/62 (2013.01); A23L 25/30 (2016.08); A23L 29/00 (2016.08); A23L 29/262 (2016.08); C08J 3/005 (2013.01); C08K 3/20 (2013.01); C08L 1/02 (2013.01); C08L 1/286 (2013.01); C08L 1/32 (2013.01); A23V 2002/00 (2013.01); C08J 2301/02 (2013.01); C08J 2401/32 (2013.01); C08L 2205/02 (2013.01)

(58) Field of Classification Search
CPC .......... A23G 1/56; A23L 29/262; C08J 3/005; C08J 2301/02; C08J 2401/32; C08J 2205/02

USPC ................ 426/573, 593, 615, 519
See application file for complete search history.

(56) References Cited

U.S. PATENT DOCUMENTS

| | | | |
|---|---|---|---|
| 3,684,523 A | * | 8/1972 | McGinley et al. |
| 2005/0272836 A1 | | 12/2005 | Yaginuma et al. |
| 2008/0107789 A1 | | 5/2008 | Akimoto |
| 2009/0225690 A1 | | 9/2009 | Lach et al. |
| 2011/0081495 A1 | | 4/2011 | Hayashi et al. |
| 2013/0022730 A1 | | 1/2013 | Obata et al. |
| 2013/0064953 A1 | | 3/2013 | Bache et al. |
| 2013/0090391 A1 | | 4/2013 | Tan et al. |
| 2013/0150462 A1 | | 6/2013 | Tan et al. |
| 2014/0171521 A1 | | 6/2014 | Enatsu et al. |
| 2014/0370180 A1 | * | 12/2014 | Tan et al. |
| 2014/0377442 A1 | | 12/2014 | Obata et al. |

FOREIGN PATENT DOCUMENTS

| | | | |
|---|---|---|---|
| EP | 1553103 | A1 | 7/2005 |
| EP | 1839449 | A2 | 10/2007 |
| JP | 2006008857 | A | 1/2006 |
| JP | 2011207956 | A | 10/2011 |
| WO | 2006062089 | A1 | 6/2006 |
| WO | 2006/076104 | A1 | 7/2006 |
| WO | 2009151018 | A1 | 12/2009 |
| WO | 2010136157 | A1 | 12/2010 |
| WO | 2011125742 | A1 | 10/2011 |
| WO | 2013022090 | A1 | 2/2013 |
| WO | 2013052114 | A1 | 4/2013 |
| WO | 2013052118 | A1 | 4/2013 |
| WO | 2013085810 | A1 | 6/2013 |
| WO | 2013122127 | A1 | 8/2013 |

OTHER PUBLICATIONS

Ang Lue et al., "Investigation of the Scaling Law on Cellulose Solution Prepared at Low Temperature", Journal of Physical Chemistry Part B: Condensed Matter, Materials, Surfaces, Interfaces & Biophsical, vol. 112, No. 15, XP055460494 , Apr. 1, 2008, pp. 4488-4495.
Official Communication issued in European Patent Office (EPO) Patent Application No. 16780060.6, dated Mar. 27, 2018.
International Search Report from Application No. PCT/JP2016/061880 dated May 24, 2016.
International Preliminary Report on Patentability from Application No. PCT/JP2016/061880, dated Oct. 17, 2017.

* cited by examiner

*Primary Examiner* — Helen F Heggestad
(74) *Attorney, Agent, or Firm* — Greenblum & Bernstein, P.L.C.

(57) ABSTRACT

The present invention relates to a cellulose composite that makes separation and aggregation less likely to occur, and, more specifically, relates to a cellulose composite comprising cellulose and one or more types of water-soluble carboxymethyl cellulose wherein tan δ of an aqueous dispersion obtained by dispersing 1 mass % of the cellulose composite in ion-exchanged water is 0.6 or lower.

11 Claims, No Drawings

CELLULOSE COMPOSITE

TECHNICAL FIELD

The present invention relates to a cellulose composite to be used in foods and beverages.

BACKGROUND ART

Cellulose composites comprising cellulose and a polysaccharide are known to become colloidal and form a network structure when dispersed in aqueous solvents. Taking advantage of this characteristic, cellulose composites are widely used in fields such as foods, pharmaceuticals, cosmetics, paints, ceramics, resins, catalysts, and other industrial goods. Cellulose composites are used in particular to stabilize suspensions, to stabilize emulsions, to impart texture, to impart cloudiness, to improve whiteness, to improve fluidity, in abrasives, to impart dietary fiber, for fat/oil substitution, and the like. For example, such cellulose composites are added for suspension stabilization of water-insoluble microparticles contained in beverages because they stabilize the cocoa powder in cocoa beverages and the milk calcium, calcium carbonate, and the like in calcium-fortified milk.

Cellulose composites having even higher suspension stabilization capacity than in the past have been desired in recent years as the types of water-insoluble microparticles added have diversified and the components added have increased in response to changing consumer needs, health consciousness, and taste differentiation.

Various studies have been conducted up to now on raising the suspension stabilization capacity of cellulose composites.

Patent Reference 1 discloses a cellulose composite comprising microcrystalline cellulose (MCC) and two types of carboxymethyl cellulose (CMC) having specific degrees of substitution. This cellulose composite is described as having a high storage modulus and being capable of stabilizing cocoa particles when added in a small amount (0.2%).

Patent Reference 2 discloses a cellulose composite comprising MCC and two types of CMC having specific degrees of substitution. This cellulose composite is described as being able to be included even in acidic and salt-containing foods.

Patent Reference 3 discloses a cellulose composite comprising MCC and CMC having a specific degree of substitution and viscosity.

Patent Reference 4 discloses a cellulose composite having a median diameter of 0.85 μm or higher, comprising MCC and a polysaccharide. This cellulose composite is described as having excellent suspension stability at low viscosity when added in a small amount to rich-tasting beverages blended with a high concentration of components such as coffee, cocoa, and black tea extract.

Patent Reference 5 discloses a cellulose composite comprising MCC and CMC having a degree of substitution of 0.95-1.5 and a viscosity of 100 cps or lower. The ability to suppress precipitation or separation in UHT-sterilized cocoa or soybean protein beverages containing this cellulose composite is described.

PRIOR ART REFERENCES

Patent References

Patent Reference 1: WO2010/136157
Patent Reference 2: WO2013/052114
Patent Reference 3: WO2013/052118
Patent Reference 4: WO2013/022090
Patent Reference 5: WO2013/085810

SUMMARY OF THE INVENTION

Problems to be Solved by the Invention

The present inventors studied high-performance cellulose composites capable of suppressing precipitation, aggregation, and separation even in beverages containing a high concentration of water-insoluble components such as cocoa, peanuts, and flour. In particular, they studied high-performance cellulose composites capable of suppressing separation and aggregation even when stored at high temperatures of 40° C. and above.

Patent Reference 1 describes a cellulose composite comprising two types of CMC having specific degrees of substitution as having a high storage modulus as well as high resistance to electrolytes and the like. An example describes that 0.5% cocoa particles in milk having a fat content of 1.5% can be stabilized when 0.1% of a cellulose composite (MCG0048) is added. However, the stabilizing effect is not necessarily adequate. In particular, aggregation and precipitation occur when the amount of cocoa particles added increases or when stored at a high temperature of 40-50° C., and the suspension stability was inadequate.

Patent Reference 2 discloses a method for producing a cellulose composite using a combination of two types of CMC having specific degrees of substitution in a specific ratio. However, the stabilizing effect by the cellulose composite of this reference was also not necessarily adequate. In addition, the cellulose composite produced by this method is said to have high initial viscosity and set-up viscosity. Therefore, the problem is that when the cellulose composite is blended with a suspended beverage, the flavor becomes heavy and the texture becomes soggy. Examples in this reference also describe only application examples such as spreads and raspberry concentrate.

Patent Reference 3 discloses a cellulose composite that blends CMC having a specific degree of substitution. Examples also disclose examples of suspended beverages that blend 1.5 wt % of cocoa in skim milk. An effect capable of suppressing creaming and upper layer separation is certainly obtained at storage temperatures of 30° C. and below, but even then the actual effect is not necessarily satisfactory. In particular, the problem is that separation and aggregation occur under rigorous storage conditions of 40° C. and higher, assuming intense heat, a car interior, a hot beverage, or the like.

Patent Reference 4 discloses examples such as cocoa, coffee, and black sesame-blended milk beverages blended with a cellulose composite. According to the examples, blending the cellulose composite provides excellent separation, aggregation, and precipitation. However, the cellulose composite contained in the beverage is 0.4%, and it is preferable to achieve an effect by blending a smaller amount. In addition, taking cocoa as an example, the amount of whole milk powder blended is 0.8 wt %, but aggregation caused by milk protein sometimes occurs when the amount of whole milk powder increases.

Precipitation or separation is certainly suppressed at low storage temperatures of 30° C. and below in the UHT cocoa and soybean protein beverages blended with the cellulose composite of Patent Reference 5. The problem, however, was that aggregation and separation occurred when stored at a high temperature of 40° C. or 50° C. In addition, a suppressive effect on precipitation and aggregation was obtained on soybean protein and water in UHT soybean protein beverages, but when a flour of peanuts, oatmeal, or the like or other edible microparticles was added, the problem was that precipitation increases and aggregation is triggered.

Means Used to Solve the Problems

As a result of in-depth studies of cellulose composites comprising cellulose and a polysaccharide such as CMC, the present inventors discovered that there is a relationship between the tan δ of the aqueous dispersion when the cellulose composite is dispersed in water and the occurrence of aggregation and separation in a beverage containing a large amount of water-insoluble microparticles. They also discovered that the use of a cellulose composite having a tan δ of a specific value or lower makes aggregation and separation less likely to occur in a beverage added with the cellulose composite, and thereby accomplished the present invention.

Specifically, the present invention is as follows.

(1) A cellulose composite comprising cellulose and one or more types of water-soluble carboxymethyl cellulose wherein the tan δ of an aqueous dispersion obtained by dispersing 1 mass % of the cellulose composite in ion-exchanged water is 0.60 or lower.

(2) The cellulose composite of (1) wherein the storage modulus (G') is 2 Pa or higher in an aqueous dispersion containing 1 mass % of the cellulose composite in ion-exchanged water.

(3) The cellulose composite of (1) or (2) wherein the median diameter according to dynamic light scattering is 600 nm or lower in an aqueous dispersion containing 0.01 mass % of the cellulose composite in ion-exchanged water.

(4) The cellulose composite of any of (1)-(3) wherein the water-soluble carboxymethyl cellulose blended in the cellulose composite comprises at least one or more types of carboxymethyl cellulose sodium.

(5) The cellulose composite of any of (1)-(4) further comprising one or more types of carboxymethyl cellulose calcium.

(6) The cellulose composite of any of (1)-(5) wherein at least one type of the water-soluble carboxymethyl cellulose is water-soluble carboxymethyl cellulose having a degree of substitution in a range of 0.86-0.94.

(7) A method for producing a cellulose composite comprising cellulose and water-soluble carboxymethyl cellulose, the cellulose composite being as defined in any of (1)-(6), wherein the method comprises a first kneading step of kneading a first water-soluble carboxymethyl cellulose and cellulose and a second kneading step of adding a second water-soluble carboxymethyl cellulose thereto and kneading, and wherein wet kneading is conducted at a shear rate of 300 (1/s) or higher in the first kneading step.

(8) The method for producing a cellulose composite of (7) wherein the water-soluble carboxymethyl cellulose used in the first kneading step comprises one or more types of water-soluble carboxymethyl cellulose sodium having a degree of substitution in a range of 0.86-0.94.

(9) The method for producing a cellulose composite of (7) or (8) wherein the first water-soluble carboxymethyl cellulose and the second water-soluble carboxymethyl cellulose are the same.

(10) The method for producing a cellulose composite of (7) or (8) wherein the first water-soluble carboxymethyl cellulose and the second water-soluble carboxymethyl cellulose are different.

(11) A food or beverage comprising the cellulose composite of any of (1)-(6) above.

(12) A beverage comprising a cellulose composite comprising cellulose and water-soluble carboxymethyl cellulose, and a water-insoluble component, the beverage having the absolute value of the zeta potential after one week of storage at 40° C. of 10 mV or higher.

(13) The beverage of (12) wherein the water-insoluble component comprises any of cocoa, cereals, or legumes.

Advantages of the Invention

Blending the cellulose composite of the present invention with a beverage containing a large amount of water-insoluble components such as cocoa, protein, peanuts, or flour makes it possible to provide a food or beverage that exhibits a uniform appearance and excellent suspension stability (for example, at least one or more among separation, aggregation, or precipitation is suppressed) after storage not only at a normal temperature of 25° C. but also at high temperatures of 40° C. and higher.

MODE FOR CARRYING OUT THE INVENTION

The present invention is described concretely below.

The cellulose composite of the present invention is a cellulose composite comprising cellulose and water-soluble carboxymethyl cellulose wherein the tan δ of an aqueous dispersion containing 1 mass % of the cellulose composite is 0.60 or lower. The storage modulus (G') of an aqueous dispersion containing 1 mass % of the cellulose composite of the present invention is also preferably 2 Pa or higher. "Compositing" in the present invention means that at least part of the cellulose surface is covered by a polysaccharide such as water-soluble carboxymethyl cellulose by chemical bonding such as hydrogen bonding or the like. Also, "suspension stability" means that at least one of separation, aggregation, or precipitation substantially does not occur and the state preferably exhibits a uniform appearance in a food or beverage containing cocoa, calcium, flour, and other such water-insoluble microparticles.

<Cellulose>

"Cellulose" in the present invention is a natural water-insoluble fibrous material containing cellulose. Examples of the raw material include wood, bamboo, wheat straw, rice straw, cotton, ramie, bagasse, kenaf, beet, sea squirt, and bacterial cellulose. One type of natural cellulosic material among these can be used as the raw material, or a mixture of two or more types can be used. Examples of available industrially mass-produced cellulose of stable quality include microcrystalline cellulose and powdered cellulose.

<Average Degree of Polymerization of Cellulose>

The cellulose used in the present invention is preferably microcrystalline cellulose, and microcrystalline cellulose having an average degree of polymerization of 500 or less is preferred. The average degree of polymerization can be measured by the reduced specific viscosity method by copper ethylenediamine solution described in the "15$^{th}$ Revised Japan Pharmacopoeia," (published by Hirokawa Shoten) microcrystalline cellulose identification test (3). An average degree of polymerization of 500 or less is preferred because physical treatments such as stirring, pulverization, and grinding of the cellulosic material in the step that composites it with water-soluble carboxymethyl cellulose are facilitated, and the advance of compositing becomes easier. The average degree of polymerization is more preferably 300 or less, even more preferably 250 or less. Since a lower average degree of polymerization facilitates the control of compositing, the lower limit is not particularly restricted, but the preferred range is 10 or above.

<Hydrolysis of Cellulose>

Examples of the method of controlling the average degree of polymerization include hydrolysis. Due to hydrolysis, depolymerization of the amorphous cellulose in the interior of the fibrous cellulose progresses, and the average degree of polymerization becomes lower. Since hydrolysis simultaneously also removes impurities such as hemicellulose and lignin in addition to the above amorphous cellulose, the interior of the fibrous cellulose becomes porous. This facilitates mechanical treatment of the cellulose and makes it easier to make the cellulose finer in steps that apply mechanical shear force to the cellulose and hydrophilic gum such as the kneading step. As a result, the surface area of the cellulose increases, and control of compositing with the polysaccharide containing water-soluble carboxymethyl cellulose is facilitated.

The method of hydrolysis is not particularly restricted; examples include acid hydrolysis, hot water decomposition, steam explosion, microwave decomposition, and the like. These methods may be used individually or in a combination of two or more types. In acid hydrolysis, the average degree of polymerization can be controlled easily by adding a suitable amount of a protic acid, carboxylic acid, Lewis acid, heteropoly acid, or the like in a state in which the cellulosic material is dispersed in an aqueous medium, and heating while stirring. The reaction conditions such as the temperature, pressure, time, and the like in this instance differ depending on the type of cellulose, cellulose concentration, type of acid, and acid concentration, but are adjusted as is appropriate for attaining the target average degree of polymerization. An example is conditions comprising using a 2 mass % or less mineral acid aqueous solution and treating the cellulose for 10 minutes or longer at 100° C. or higher under increased pressure. Under these conditions, the catalytic component such as the acid penetrates to the interior of the fibrous cellulose and promotes hydrolysis. Lowering the amount of catalytic component used also facilitates subsequent purification.

<Microcrystalline Cellulose (Ordinary Cellulose in Crystalline Form)>

The microcrystalline cellulose that can be used in the present invention is obtained by partially depolymerizing α-cellulose, obtained from a fibrous plant as pulp, by acid and purifying. For example, this corresponds to the microcrystalline cellulose described in the "15$^{th}$ Revised Japan Pharmacopoeia," (published by Hirokawa Shoten).

The state when dispersed in water differs in microcrystalline cellulose and powdered cellulose. As a comparison of this state of aqueous dispersion, microcrystalline cellulose appears white, opaque, and creamy with no separation while powdered cellulose is known to separate and divide into a supernatant and precipitate when the cellulose is dispersed in water, a dispersion produced by grinding by a homogenizer, and the state examined visually. For example, water and cellulose are weighed out to make a cellulose content of 10 mass %, dispersions are produced by stirring for 10 minutes at 12,000 rpm by a TK homomixer (manufactured by Tokushu Kika Kogyo Co., Ltd., Mark II) in a 25° C. atmosphere, and the white suspensions obtained by treating this dispersion by a high-pressure homogenizer (manufactured by APV Inc., Manton-Gaulin homogenizer, pressure 15 MPa) can be compared in a suspension-stable state after standing for one hour at 25° C.

The cellulose used in the present invention is preferably microcrystalline cellulose because it is less likely to feel gritty and microcrystalline cellulose has an excellent feel going down the throat when microcrystalline cellulose is blended with a food or beverage as a cellulose composite.

<Particle Shape (L/D) of Cellulose>

The cellulose in the cellulose composite of the present invention is preferably in the shape of fine particles. The cellulose particle shape is represented by the ratio (L/D) of the long diameter (L) and short diameter (D) of a particle image obtained by making a ion-exchanged water suspension having a cellulose composite concentration of 1 mass %, diluting an aqueous dispersion obtained by dispersing by a high-shear homogenizer (manufactured by Nippon Seiki Co., Ltd., product name "Excel Autohomogenizer ED-7," treatment conditions: speed 15,000 rpm×5 minutes) to 0.1-0.5 mass % by ion-exchanged water, casting on mica, and measuring the dried product by a high-resolution scanning electron microscope (SEM) or atomic force microscope (AFM), and calculated as the average value of 100-150 particles.

L/D is preferably less than 20, more preferably 15 or less, even more preferably 10 or less, especially preferably 5 or less, particularly preferably less than 5. The lower limit value of L/D is preferably greater than 1, more preferably 2 or higher, and even more preferably 3 or higher. A higher L/D value means that the cellulose is in an elongated shape. This is because grittiness is less likely to be felt and the feel going down the throat is excellent within this range.

<Water-Soluble Carboxymethyl Cellulose (Water-Soluble CMC)>

Water-soluble carboxymethyl cellulose is blended as one type of polysaccharide in the cellulose composite of the present invention. Carboxymethyl cellulose is a type of cellulose derivative. Carboxymethyl cellulose is a generic term for a cellulose derivative in which some or all of the hydrogen atoms in the hydroxyl groups have been substituted by carboxymethyl groups that has a cellulose skeleton of β-1,4-bonded D-glucose and a structure in which hydrogen atoms in the cellulose hydroxyl groups (three hydroxyl groups are present in one glucose residue unit in cellulose) have been substituted by carboxymethyl groups ($-CH_2COO^-$) by reaction with monochloroacetic acid. Water-soluble carboxymethyl cellulose is preferred for promoting compositing with cellulose by kneading using water as the solvent. It is especially preferable to use carboxymethyl cellulose in which the carboxymethyl groups of the glucose residues in the water-soluble carboxymethyl cellulose take on a salt structure.

Whether or not a specific carboxymethyl cellulose is water-soluble depends on the following criteria. Three grams of a sample of the carboxymethyl cellulose is added to 297 g of ion-exchanged water and stirred for five minutes at 15,000 rpm using an Excel autohomogenizer. One hundred milliliters of the aqueous solution (or aqueous dispersion) produced is placed in a 100 mL precipitation tube, and the amount of precipitate (mL) is measured visually after being left to stand for three hours at 25° C. The carboxymethyl cellulose is taken to be water-soluble when the amount of precipitate is less than 1 mL (1%). Nonlimiting examples of water-soluble CMC include, from the viewpoint of the ease of compositing, carboxymethyl cellulose sodium, carboxymethyl cellulose potassium, and carboxymethyl cellulose ammonium.

<Blend Ratio of Cellulose and Water-Soluble CMC>

The cellulose composite of the present invention preferably comprises 50-99 mass % of cellulose and 1-50 mass % of polysaccharide including water-soluble CMC. The cellulose composite becomes dispersible in an aqueous dispersion by covering the surface of the cellulose particles by the polysaccharide by chemical bonding such as hydrogen bonding by compositing the cellulose and the polysaccharide, and the suspension stability is improved by the formation of a network structure. In addition, compositing the cellulose and polysaccharide in the above composition is preferred for the effective advance of compositing. The amount of cellulose blended is more preferably 60 mass % or higher, even more preferably 70 mass % or higher, and especially preferably 75 mass % or higher. The preferred upper limit is 95 mass % or less, especially preferably 90 mass % or less. The amount of polysaccharide blended is more preferably 5 mass % or higher, even more preferably 10 mass % or higher. The upper limit is more preferably 40 mass % or less, even more preferably 30 mass % or less, and especially preferably 25 mass % or less.

The water-soluble carboxymethyl cellulose used in the present invention is preferably a blend of two or more types of carboxymethyl cellulose different in terms of at least one of the type of counterion, degree of substitution, and viscosity. It is more preferable to blend three or more types. This obtains a cellulose composite having a low tan δ and a high G'.

Here, taking the viscosity of the first water-soluble carboxymethyl cellulose as η1 and the degree of substitution as DS1 and taking the viscosity of the second water-soluble carboxymethyl cellulose as η2 and the degree of substitution as DS2, and the type of counterion being the same, the water-soluble carboxymethyl celluloses are taken to be the same when the value of (η1−η2)/(η1+η2) is −0.20 to 0.20 and the value of (DS1−DS2)/(DS1+DS2) is −0.025 to 0.025, and the water-soluble carboxymethyl celluloses are taken to be different in other cases.

The preferred blend ratio when two types are blended is 1-99 mass % of the second water-soluble CMC relative to 99-1 mass % of the first water-soluble CMC. When three types are blended, blending in a ratio of 98-1 mass % of the first water-soluble CMC, 1-98 mass % of the second water-soluble CMC, and 1-98 mass % of the third water-soluble CMC is preferred. In sum, it is preferable to blend 1 mass % or more of another (each, in the case of multiple types) water-soluble CMC relative to the total amount of water-soluble CMC. It is more preferable to blend 2 mass % or more of another (each, in the case of multiple types) water-soluble CMC.

<Carboxymethyl Cellulose Sodium (CMC-Na)>

Carboxymethyl cellulose sodium is a polysaccharide among the above water-soluble CMC in which the carboxymethyl groups of the glucose residues in the cellulose become sodium salts. CMC-Na is a fine, white powder and dissolves rapidly in water.

Typical production methods are aqueous medium methods and solvent methods. There are two aqueous medium methods: the alkali method in which alkali cellulose is produced first and monochloroacetic acid or a sodium salt thereof then added and the Hayakawa method in which cellulose is mixed together with sodium monochloroacetate solution, pulverized, and sodium hydroxide then added. Various types of solvents and mixed solvents can be used in solvent methods, and a method using isopropyl alcohol is common. Alkali cellulose is produced by reacting isopropyl alcohol with cellulose and sodium hydroxide, monochloroacetic acid is added thereto to conduct an etherification reaction, followed by washing with methanol. Compounds called carmellose sodium and sodium carboxyl cellulose are also included in CMC-Na in the present invention.

<Degree of Substitution of CMC-Na>

The upper limit of the theoretical value of the degree of substitution of CMC-Na is 3, and CMC-Na can be used in the present invention as long as it is within this range. However, the CMC-Na used in the present invention preferably has a degree of substitution of 1.5 or lower. The lower limit is preferably 0.5 or higher. The degree of substitution is preferably 0.7 or higher, more preferably 0.8 or higher, even more preferably 0.86 or higher, and especially preferably 0.91 or higher to obtain a cellulose composite having a low tan δ. The upper limit is preferably 1.5 or lower, more preferably 1.1 or lower, even more preferably 1.0 or lower, and especially preferably 0.94 or lower.

The degree of substitution of the CMC-Na is preferably 0.7 or higher, more preferably 0.86 or higher, even more preferably 1.0 or higher, and especially preferably 1.1 or higher to raise the storage modulus G' of the cellulose composite. The upper limit is preferably 1.5 or lower, more preferably 1.3 or lower, and even more preferably 1.2 or lower.

Two or more types of these CMC-Na can be mixed and composited with cellulose to obtain the desired tan δ and G' values of the cellulose composite. Compositing can also be performed by addition to cellulose in multiple stages. Compositing by addition in multiple stages is preferred for obtaining a cellulose composite having a low tan δ and high G'.

The degree of substitution here is measured by the following method stipulated by the Japan Pharmacopoeia. Precisely 0.5 g of sample (anhydride) is weighed out, wrapped in filter paper, and incinerated in a magnetic crucible. After cooling, the sample is transferred to a 500 mL beaker where approximately 250 mL of water and 35 mL of 0.05 M sulfuric acid are added and the combination is boiled for 30 minutes. After cooling, phenolphthalein indicator is added, the excess acid is back titrated by 0.1 M potassium hydroxide, and the degree of substitution is calculated using the following formula.

$$A=((af-bf1)/\text{mass of sample anhydride }(g))-\text{alkalinity (or +acidity)}$$

$$\text{Degree of substitution}=(162 \times A)/(10000-80 \times A)$$

Here, definitions are as follows.

A: Amount of 0.05 M sulfuric acid (mL) consumed by alkali in 1 g of sample
a: Amount of 0.05 M sulfuric acid used (mL)
f: Potency of 0.05 M sulfuric acid
b: Titer of 0.1 M potassium hydroxide (mL)
f1: Potency of 0.1 M potassium hydroxide
162: Molecular weight of glucose
80: Molecular weight of $CH_2COONa-H$ Alkalinity (or acidity) measurement method: Precisely 1 g of sample (anhydride) is measured out into a 300 mL flask and dissolved by adding approximately 200 mL of water. Five milliliters of 0.05 M sulfuric acid is added, boiled for 10 minutes, then cooled. Phenolphthalein indicator is added, and the solution is titrated by 0.1 M potassium hydroxide (S mL). A blank test (B mL) is conducted in the same way using water containing no sample. The alkalinity (or acidity) is calculated using the following formula.

$$\text{Alkalinity}=\{(B-S) \times f\}/\text{mass of sample anhydride }(g)$$

Here, f is defined as the potency of the 0.1 M potassium hydroxide. The value of {(B−S)×f} when negative denotes acidity.

Furthermore, the degree of substitution of water-soluble CMC other than CMC-Na can also be measured by the same method.

<Viscosity of CMC-Na>

The viscosity of the CMC-Na used in the present invention is preferably 450 mPa·s or lower in a 1 mass % aqueous solution. The viscosity here is measured by the following method. First, 1 mass % of CMC-Na powder is measured out, and ion-exchanged water is added to make a total of 300 g. This is dispersed for five minutes at 15,000 rpm using a high-shear homogenizer (manufactured by Nippon Seiki Co., Ltd., product name "Excel Autohomogenizer ED-7"). After standing for one hour at 25° C., a rotor is installed in a Brookfield viscometer (manufactured by Toki Sangyo Co., Ltd., product name "TV-10," rotor speed 60 rpm), the aqueous solution is allowed to stand for 60 seconds, then rotated for 30 seconds and measured. However, the rotor can be changed to suit the viscosity. The measurement temperature is 25° C. The lower the viscosity of the CMC-Na is, the more easily compositing with cellulose is promoted, the tan δ of the aqueous dispersion can be kept low when the cellulose composite is dispersed in water, and the median diameter of the cellulose composite measured by dynamic light scattering decreases. The viscosity of the CMC-Na is more preferably 350 mPa·s or lower, even more preferably 200 mPa·s or lower, especially preferably 100 mPa·s lower, and particularly preferably 50 mPa·s or lower. The lower limit is not particularly set, but the preferred range is 1 mPa·s or higher.

Furthermore, the viscosity of water-soluble CMC other than CMC-Na can also be measured by the same method.

<Amount Added and Blend Ratio of CMC-Na>

It is preferable to blend one or more types as the CMC-Na added in the cellulose composite of the present invention. For the aforementioned reasons, it is preferable to use two or more types of CMC-Na in combination to obtain a cellulose composite having a low tan δ and high G'. In this case, it is more preferable to use CMC-Na having different degrees of substitution in combination.

In particular, when CMC-Na is co-processed with cellulose divided into two or more stages, it is preferable to blend CMC-Na having a degree of substitution of from 0.86 to 0.94 with cellulose (not a composite) and co-process in the first stage. Blending this CMC-Na in the first stage promotes compositing with the cellulose and helps to keep the tan δ low. The CMC-Na blended in this first stage preferably has a low viscosity. The viscosity is preferably 450 mPa·s or lower, preferably 100 mPa·s or lower, and more preferably 50 mPa·s or lower. This makes it possible to keep the tan δ lower.

The CMC-Na blended in the second stage may be the same as the CMC-Na blended in the first stage, but it is preferable to use one with a degree of substitution higher than the CMC-Na blended in the first stage. Specifically, the degree of substitution of the CMC-Na blended in the second stage is preferably 0.95-1.5, more preferably 1.1-1.5.

When two or more types of CMC-Na are blended, the first CMC-Na and second CMC-Na may be blended with the cellulose simultaneously, but it is preferable to blend the first CMC-Na with the cellulose in the first stage and co-process (for example, wet kneading), and to blend the second CMC-Na in the second stage and co-process. One having a higher degree of substitution than the first CMC-Na is preferably used as the second CMC-Na. This makes it possible to lower the tan δ and raise the G' of the cellulose composite.

For each CMC-Na, it is preferable to blend 1-25 mass % of the first CMC-Na and to blend 1-25 mass % of the second CMC-Na relative to the total weight of the cellulose composite. More preferred is 1-15 mass % of the first CMC-Na and 1-10 mass % of the second CMC-Na. Even more preferred is 1-10 mass % of the first CMC-Na and 1-5 mass % of the second CMC-Na. This makes it possible to lower the tan δ and raise the G' of the cellulose composite.

<Carboxymethyl Cellulose Calcium (CMC-Ca)>

Carboxymethyl cellulose calcium is a polysaccharide having calcium at the ends in which some or all of the primary or secondary alcoholic hydroxyl groups (a total of three are present per glucose) of the glucose residues in cellulose are ether bonded with carboxymethyl groups. A typical production method involves making water-insoluble CMC acid by acid treating a carboxymethylated ether derivative of cellulose, to obtain purified CMC acid by washing thoroughly with water, and then to neutralize by adding calcium carbonate to the purified CMC acid to produce a calcium salt. Compounds called carmellose calcium and calcium carboxyl cellulose are also included in CMC-Ca in the present invention. The appearance of CMC-Ca is that of a fine, white powder. Unlike the CMC-Na discussed previously, it is insoluble in water and acid and dissolves partially in alkali. In other words, CMC-Ca does not fall under the water-soluble carboxymethyl celluloses discussed above. On the other hand, CMC-Ca is known to have high water absorbency.

One or more types of CMC-Ca are preferably blended in the present invention. Since CMC-Ca has excellent water absorbency, the solids fraction concentration can be raised easily during kneading when compositing cellulose and water-soluble carboxymethyl cellulose. This is preferred for further promoting the compositing of the cellulose and water-soluble CMC. CMC-Ca having a degree of substitution and viscosity regulated to specific ranges is preferably used. The degree of substitution and viscosity are defined in the same way as for CMC-Na. The degree of substitution is preferably 0.5 or higher, and the upper limit is preferably 2 or lower. The viscosity is preferably 500 mPa·s or lower, more preferably 100 mPa·s or lower. The lower limit is 1 mPa·s or higher. The preferred blend ratio of CMC-Ca is 0.01-50 mass % relative to the total mass of the water-soluble CMC and CMC-Ca. This is because, within this range, processing can be carried out with no problem without kneading becoming too hard in a state in which the solids concentration is raised during kneading.

<Cellulose Composite>

The cellulose composite of the present invention is one that composites a polysaccharide including water-soluble carboxymethyl cellulose with cellulose, which is the main component. Compositing, as was mentioned above, means a state in which at least part of the surface of the particles that construct the cellulose powder is covered by polysaccharide by chemical bonding such as hydrogen bonding or the like. Therefore, the cellulose composite is not a state in which cellulose powder and polysaccharide are simply mixed but rather a state in which the polysaccharide covers the surface of the cellulose particles. Therefore, when the cellulose composite is dispersed in an aqueous medium, the polysaccharide such as water-soluble carboxymethyl cellulose forms a structure that spreads out radially from the surface without separating from the surface of the cellulose particles, forming a colloidal state in water. A cellulose composite present in this colloidal state can form a higher network structure through interactions such as static repulsion, steric repulsion, van der Waals force, and the like.

Examples of polysaccharides in the present invention other than the CMC-Na and CMC-Ca described above include hydrophilic polymers. Here, hydrophilic means having the characteristic of dissolving in part in ion-exchanged water of normal temperature. To define hydrophilic quantitatively, 0.05 g of the water-soluble polymer is dissolved to equilibrium in 50 mL of ion-exchanged water by stirring (by a stirrer chip or the like), and 1 mass % or more of the component that passes through when treated by a 1 μm mesh membrane filter is contained in the polysaccharide.

Polysaccharides that can be used in the present invention are compounds that comprise a sugar or polysaccharide in part of the chemical structure. In addition to water-soluble carboxymethyl cellulose, suitable examples include gellan gum, *psyllium* seed gum, locust bean gum, xanthan gum, guar gum, tara gum, tamarind seed gum, karaya gum, chitosan, gum Arabic, ghatti gum, glucomannan, tragacanth gum, agar, carrageenan, alginic acid, sodium alginate, calcium alginate, propylene glycol alginate, HM pectin, LM pectin, *Azotobacter vinelandii* gum, curdlan, pullulan, dextran, methyl cellulose, hydroxypropyl cellulose, hydroxyethyl cellulose, and other such cellulose derivatives, and polydextrose.

In addition, the cellulose composite may comprise a hydrophilic substance that is not a polymer in addition to or in place of the above polysaccharide to increase the dispersibility in aqueous media. The hydrophilic substance functions as a disintegrating agent or wicking agent when dispersed in an aqueous medium. Therefore, covering the surface of the cellulose particles by a hydrophilic substance further facilitates the dispersion of the cellulose composite in water.

In short, the hydrophilic substance that is not a polymer is an organic substance that has high solubility in cold water and causes virtually no viscosity; starch hydrolysates, dextrins, indigestible dextrin, fructooligosaccharides, galactooligosaccharides, maltooligosaccharides, isomaltooligosaccharides, lactose, maltose, sucrose, α-, β-, γ-cyclodextrin, and other such oligosaccharides; glucose, fructose, sorbose, and other such monosaccharides; maltitol, sorbitol, erythritol, and other such sugar alcohols; and the like are suitable. These hydrophilic substances may be used in combinations of two or more types. Starch hydrolysates, dextrins, and indigestible dextrin are preferred among the above in terms of dispersibility. A few of the hydrophilic substances, such as dextrins and indigestible dextrin, also function as polysaccharides. Although it is desirable to use a water-soluble polymer in combination even when such hydrophilic substances are used, not using a polysaccharide in such cases is another embodiment. Other components are blended freely to the extent that they do not harm the dispersion and stability of the composition in water.

<Aqueous Dispersion Characteristics of Cellulose Composite>

The cellulose composite of the present invention can form a three-dimensional network structure when added to a medium such as water and stirred to disperse to the submicron to several microns level. The polysaccharide on the surface of the cellulose particles first dissolves in water, the granulated material is disintegrated by the penetration of solvent from the pores into the interior of the granulated material when numerous pores appear in the surface of the granulated material, and the material disperses to a state of primary particles. Since the surface of the cellulose particles that form a colloidal state at this time is negatively charged, a three-dimensional network structure is formed by repulsion between the microcrystalline cellulose particles. Therefore, the cellulose can disperse stably in the solvent regardless of the fact that it is water-insoluble particles having a specific gravity of 1 or higher.

<Storage Modulus (G') of Cellulose Composite>

The storage modulus (G') of the cellulose composite of the present invention is described.

For the cellulose composite of the present invention, the storage modulus (G') of an aqueous dispersion containing 1 mass % of the cellulose composite in ion-exchanged water is preferably 2 Pa or higher. The storage modulus expresses the rheological elasticity of the aqueous dispersion and represents the degree of compositing of the cellulose and polysaccharide including water-soluble CMC. A higher storage modulus means that compositing of the cellulose and polysaccharide has advanced and that the network structure of the cellulose composite in the aqueous dispersion is rigid. The more rigid the network structure, the better the suspension stability of the cellulose composite.

The storage modulus in the present invention is the value obtained by dynamic viscoelasticity measurement of an aqueous dispersion in which 1 mass % of the cellulose composite is dispersed in ion-exchanged water. The elastic component that retains the stress stored inside the cellulose composite network structure when strain is applied to the aqueous dispersion is expressed as the storage modulus.

As the method for measuring the storage modulus, 1 mass % of the cellulose composite is first dispersed in ion-exchanged water using a high-shear homogenizer (manufactured by Nippon Seiki Co., Ltd., product name "Excel Autohomogenizer ED-7," treatment conditions: speed 15,000 rpm×5 minutes). The aqueous dispersion obtained is allowed to stand for one day at room temperature. The strain dependence of the stress of this aqueous dispersion is measured by a viscoelasticity measurement instrument (manufactured by Rheometric Scientific, Inc., model ARES G2, geometry: Double Wall Couette type, temperature: constant 25.0° C., angular velocity: 20 rad/sec, strain: sweep in the 1→794% range; the aqueous dispersion is supplied slowly using an eyedropper so as not to destroy the microstructures, and measurement is begun in Dynamic Strain mode after allowing to stand for five minutes). The storage modulus in the present invention is the value of 20% strain at 25° C. on the strain-stress curve obtained by the above measurement. The higher the value of the storage modulus is, the more elastic the structures of the aqueous dispersion formed by the cellulose composite are and the more rigid the network of cellulose is. In sum, the higher the storage modulus is, the higher the precipitation-suppressing effect on food microparticles is.

The storage modulus of an aqueous dispersion including 1 mass % of cellulose composite in ion-exchanged water is preferably 2 Pa or higher, more preferably 2.5 Pa or higher, even more preferably 3 Pa or higher, especially preferably 4 Pa or higher, and most preferably 5 Pa or higher.

The upper limit is not particularly set, but is 10 Pa or less in consideration of the ease of drinking when blended in a beverage and the workability when dispersed in water. A storage modulus within this range is preferred because the flavor of the beverage will be light at the amount of cellulose composite added to obtain adequate suspension stability of the beverage (although it differs depending on the form of the food or beverage, for example, 0.01-1.0 mass % in a cocoa beverage).

<Tan δ of Cellulose Composite>

The tan δ of the cellulose composite of the present invention is described. The loss modulus G" can be measured at the same time as the storage modulus G' by the above method as a rheological characteristic of the aqueous dispersion of the cellulose composite of the present invention. The viscosity component that retains the stress stored inside the cellulose composite network structure when strain is applied to the aqueous dispersion is expressed as the loss modulus. The loss modulus G" in the present invention is the value of 20% strain at 25° C. on the strain-stress curve obtained by the above measurement.

The ratio of the storage modulus and loss modulus is expressed as tan δ, which is expressed by the following formula. Specifically, tan δ in the present invention is the value of 20% strain at 25° C.

$$\tan \delta = G'' \text{ (loss modulus)}/G' \text{ (storage modulus)}$$

Here, a tan δ value of less than 1 means that the cellulose network structure is elastic. A tan δ value of 1 or higher means that the structure is viscous. tan δ of an aqueous solution of the cellulose composite of the present invention is 0.60 or lower. It is a feature of the cellulose composite of the present invention that the value of tan δ when made into an aqueous dispersion is lower than that of conventional cellulose composites. This means that the cellulose network is elastic and rigid in a system blended with a large amount of water-insoluble food microparticles. In sum, since the Brownian motion of the cellulose particles that have become colloidal is active in a system blended with a large amount of water-insoluble food microparticles, the cellulose particles are thought to characteristically impact each other intensely, forming dense interactions, and making aggregation with the food microparticles difficult. This aggregation-suppressing effect is expressed more markedly when the storage temperature of the food is high. This is thought to be because the Brownian motion of the food microparticles at high temperature is activated by thermal motion, proteins are also denatured, and aggregation is facilitated since the charge balance is neutralized by the positively charged colloidal particles, but the cellulose composite of the present invention is highly effective in negating this.

tan δ is preferably 0.55 or lower, more preferably 0.50 or lower, even more preferably 0.45 or lower, especially preferably 0.44 or lower, more especially preferably 0.40 or lower, and most preferably 0.38 or lower. The lower limit is not particularly set, but is preferably 0.10 or higher.

<Median Diameter of Cellulose Composite by Dynamic Light Scattering>

A feature of the cellulose composite of the present invention is that the median diameter is smaller than that of conventional cellulose composites when an aqueous dispersion is measured by dynamic light scattering.

The method of measuring the median diameter of an aqueous dispersion by dynamic light scattering is described here. An aqueous dispersion is produced by dispersing 0.01 mass % of the cellulose composite in ion-exchanged water using a high-shear homogenizer (manufactured by Nippon Seiki Co., Ltd., product name "Excel Autohomogenizer ED-7," treatment conditions: speed 15,000 rpm×5 minutes). This aqueous dispersion is sonicated (manufactured by EYLA Inc., product name "AU-180C") for 10 minutes, and the particle size distribution (frequency distribution of scattering intensity to particle size value) is measured by a zeta potential meter (manufactured by Otsuka Electronics Co., Ltd., product name "ELS-Z2"). Here, the median diameter is the particle size value (μm) corresponding to 50% scattering intensity integration in this frequency distribution.

This median diameter by dynamic light scattering serves as an indicator of the Brownian motion of the cellulose particles that have become colloidal because the median diameter is measured in an aqueous solution having a very low concentration of 0.01 mass % of cellulose composite. In other words, the smaller the median diameter by dynamic light scattering is, the smaller the spread of water-soluble CMC extending from the cellulose is. This means that the interaction between cellulose and cellulose is stronger than the interaction between water-soluble CMC and water-soluble CMC. In sum, the distance between cellulose and cellulose is short, meaning that a dense, rigid network forms. Therefore, the smaller the median diameter measured by dynamic light scattering is, the less likely separation is to occur after storage as described below in suspended food and beverages including a large amount of food microparticles.

The median diameter by dynamic light scattering is preferably 600 nm or lower, more preferably 500 nm or lower, even more preferably 450 nm or lower, even more preferably 400 nm or lower, and especially preferably 350 nm or lower. The lower limit is not particularly set, but is preferably 30 nm or higher in consideration of the structure of the cellulose itself.

<Median Diameter of Cellulose Composite by Laser Diffraction/Scattering>

A feature of the cellulose composite of the present invention is that the median diameter by laser diffraction/scattering is small.

The size of this median diameter can be measured by the following method. First, an aqueous dispersion is produced by dispersing 1 mass % of the cellulose composite in ion-exchanged water using a high-shear homogenizer (manufactured by Nippon Seiki Co., Ltd., product name "Excel Autohomogenizer ED-7," treatment conditions: speed 15,000 rpm×5 minutes). The median diameter by laser diffraction/scattering is the integrated 50% particle diameter (volume average particle diameter) in the volume frequency particle size distribution when this aqueous solution is measured by a laser diffraction/scattering particle size distribution analyzer (manufactured by Horiba, Ltd., product name "LA-910", included sonication function: 1 minute, refractive index: 1.20). This median diameter is preferably 40 μm or lower since the dispersion stability of the cellulose composite in water is then excellent. This also makes it possible to provide a food free of grittiness and having smooth passage down the throat when a food or beverage containing the cellulose composite is eaten. The median diameter is more preferably 30 μm or lower, and especially preferably 10 μm or lower. The lower limit is not particularly set, but is preferably 0.1 μm or higher.

The median diameter by laser diffraction/scattering corresponds to the diameter of the cellulose itself.

<Zeta Potential when the Cellulose Composite is in a State of Aqueous Dispersion>

The zeta potential when the cellulose composite of the present invention is in a state of aqueous dispersion is preferably −40 mV or lower. The method of measuring the zeta potential is described here. An aqueous dispersion is produced by dispersing 0.2 mass % of the cellulose composite in ion-exchanged water using a high-shear homogenizer (manufactured by Nippon Seiki Co., Ltd., product name "Excel Autohomogenizer ED-7," treatment conditions: speed 15,000 rpm×5 minutes). This aqueous dispersion is sonicated (manufactured by EYLA Inc., product name "AU-180C") for 10 minutes, then measured using a zeta potential meter (manufactured by Otsuka Electronics Co., Ltd., product name "ELS-Z2") at 25° C., integration number: 20 times, refractive index of solvent: 1.33, dielectric constant of solvent: 78.3. The zeta potential is more preferably −50 mV or lower, and especially preferably −70 mV or lower. Cellulose that has become colloidal has a negative zeta potential value because it is negatively charged, but a larger negative absolute value is preferred for stronger network interactions of the colloidal particles and a higher degree of stabilization.

<Method for Producing Cellulose Composite>

The method for producing the cellulose composite of the present invention is described. A cellulose composite having the specific tan δ of the present invention is obtained by applying mechanical shear force to cellulose and polysaccharide including water-soluble CMC in a compositing step and compositing the polysaccharide on the cellulose surface together with making the cellulose very fine by size reduction. Polysaccharides other than water-soluble CMC, hydrophilic substances, and other additives, and the like may also be added. The material that has been subjected to the above treatment may be dried as needed. The cellulose composite of the present invention may have any form, such as undried or subsequently dried after being subjected to the above mechanical shear.

A method of kneading using a kneader or the like can be used to apply mechanical shear force. A kneader, extruder, planetary mixer, crusher, or the like can be used as a kneader, and may be either a continuous or a batch type. The temperature during kneading may be uncontrolled, but kneading may be carried out while removing heat when heat is generated by the compositing reaction, friction, or the like during kneading. These devices may be used individually, or two or more types of device may be used in combination. These devices may be selected as is appropriate depending on the viscosity requirement and the like in various applications.

However, a lower kneading temperature is preferred for suppressing deterioration of the polysaccharide and raising the storage modulus (G') of the cellulose composite obtained as a result. The kneading temperature is preferably 100° C. or lower, more preferably 90° C. or lower, and especially preferably 70° C. or lower. The lower limit is preferably 0° C. or higher, more preferably 20° C. or higher, and even more preferably 30° C. or higher. One may also freely devise heat removal by jacket cooling, heat radiation, and the like to maintain a temperature of the above range in a state in which mechanical shear is applied.

The solids fraction during kneading is preferably set at 20 mass % or higher. Kneading the kneaded material in a high-viscosity, semi-solid state is preferred because it facilitates transmission of the kneading energy described below to the kneaded material and promotes compositing. The solids fraction during kneading is more preferably 30 mass % or higher, even more preferably 40 mass % or higher, and especially preferably 46 mass % or higher. The upper limit is not particularly restricted, but a realistic range is preferably 90 mass % or lower in consideration of obtaining an adequate kneading effect and uniformly kneaded state without the kneaded material forming a discontinuous granular state with a low water content. The upper limit is more preferably 70 mass % or lower, even more preferably 60 mass % or lower. As regards the timing of water addition to bring the solids fraction within the above range, the necessary amount of water may be added before the kneading step, water may be added during the kneading step, or both may be done.

The shear rate is described here. The shear rate is calculated by the following formula in a twin-screw extruder or kneader. Furthermore, the shear rate is also expressed as shear rate.

Shear rate $(\gamma) = \pi DN/h$

The following definitions apply to the above formula:
D: rotor outer diameter (mm)
N: rotor speed (1/sec)
h: chip clearance (mm)

In the present invention, the shear rate is preferably 150 (1/s) or higher, more preferably 300 (1/s) or higher. Within this range, compositing of the cellulose and polysaccharide including water-soluble CMC advances readily. When the amount of polysaccharide blended is small relative to the cellulose, a higher shear rate is preferred to bring about effective contact between the cellulose and polysaccharide, promote size reduction, and allow compositing to advance. Kneading at a rapid shear rate is preferred to make the storage modulus larger and make the median diameter measured by dynamic light scattering smaller when the cellulose composite is dispersed in water. The upper limit is preferably 10,000 (1/s) or lower so as not to place an excessive burden on the equipment.

The shear rate and shear time can be adjusted in compositing of the cellulose and polysaccharide including water-soluble CMC. It is usually preferable to apply shear for two minutes or longer in the above range of shear rate. This is because applying shear for two minutes or longer promotes grinding of the cellulose and compositing with the polysaccharide. The more preferred shear time is five minutes or longer. Although no upper limit is established, it is preferable to establish the operating time based on an understanding of the relationship of the shear time necessary relative to the shear rate since the polysaccharide deteriorates and compositing is attenuated when excessive shear is applied over time.

It is especially preferable to adjust the shear rate and shear time in accordance with the ratio of polysaccharide including water-soluble CMC relative to the cellulose to express a tan δ within the target range. For example, when the ratio of polysaccharide to cellulose is low, the dependence on the shear time is low, but when the ratio of polysaccharide increases, a longer shear time is preferred to lower the tan δ.

It is preferable in production of the cellulose composite of the present invention, when water-soluble CMC is added in multiple stages, to comprise a first kneading step (stage one) of wet kneading a first water-soluble CMC and cellulose at a shear rate of 300 (1/s) or higher and a second kneading step (stage two) of adding a second water-soluble CMC and kneading. A shear rate of 400 (1/s) or higher is more preferred. Furthermore, wet kneading is also preferred in the second kneading step. In addition, the water-soluble CMC added in each kneading step may be added all at once or added divided over a number of times.

In the kneading of stage one and stage two, the shear rate is preferably adjusted to a rate suited to each water-soluble CMC added. For example, when water-soluble CMC having a degree of substitution of 0.86-0.94 is added as the first water-soluble CMC in the first kneading step, kneading at a first shear rate of 300 (1/s) or higher is preferred; 400 (1/s) or higher is more preferred, 500 (1/s) or higher is even more preferred, and 700 (1/s) or higher is especially preferred. Although the upper limit of the first shear rate is not particularly restricted, for example, 10,000 (1/s) or lower is preferred, 5,000 (1/s) or lower is more preferred, and 2,000 (1/s) is even more preferred. Next, when a second water-soluble CMC having a degree of substitution of 1.1-1.5 is added to the cellulose composite obtained as described above in the second kneading step, kneading at a second shear rate of 1000 (1/s) or lower is preferred; 800 (1/s) or lower is more preferred, and 500 (1/s) or lower is especially preferred. Although the lower limit of the second shear rate is not particularly restricted, for example, 1 (1/s) or higher is preferred, 10 (1/s) or higher is more preferred, and 100 (1/s) or higher is even more preferred. This is because size reduction of the cellulose and compositing of the water-soluble CMC and cellulose are promoted in the first kneading step, and G' is raised in the second kneading step. This method makes it possible to raise G' relative to G" and therefore to obtain a cellulose composite having a low tan δ.

It is also a preferred embodiment to add CMC-Ca as described above to promote size reduction of the cellulose and compositing of the water-soluble CMC by raising the solids fraction in the first kneading step.

A known drying method such as shelf drying, spray drying, belt drying, fluidized bed drying, freeze drying, microwave drying, and the like can be used when drying the kneaded material obtained from the kneading step described above to obtain the cellulose composite of the present invention. It is preferable when supplying the kneaded material to the drying step to maintain the solids fraction concentration of the kneading step and supply the kneaded material to the drying step without adding water. The water content of the cellulose composite after drying is preferably 1-20 mass %. Making the water content 20 mass % or less reduces the likelihood of problems such as stickiness and decay and problems of cost in transport. The water content is more preferably 15 mass % or less, and especially preferably 10 mass % or less. In addition, there is no deterioration of dispersibility due to excessive drying when the water content is 1 mass % or higher. The water content is more preferably 1.5 mass % or higher.

Since a powder is an easy form to handle when the cellulose composite is distributed on the market, the cellulose composite obtained by drying is preferably made into a powder by pulverization. However, when spray drying is used as the drying method, pulverization need not be performed since drying and powdering occur simultaneously. A known method such as a cutter mill, hammer mill, pin mill, jet mill, or the like can be used when pulverizing the dried cellulose composite. The degree of pulverization is such that the pulverized powder all passes through a 1 mm mesh sieve. More preferably, all of the powder passes through a 425 µm mesh sieve, and the powder is preferably pulverized so that the average particle size (weight average particle diameter) is 10-250 µm.

The dried cellulose composite disperses easily when stirred in water, and a stable colloidal dispersion having a smooth texture and no grittiness in which the cellulose is dispersed uniformly is formed. Since a stable colloidal dispersion forms with no aggregation or separation of the cellulose, the cellulose composite functions well as a stabilizer and the like.

<Method for Adding Water-Soluble CMC (Kneading Step)>

A method of adding dry, powdered water-soluble CMC to cellulose that has been made to have a wet cake state is preferred in the compositing step of the cellulose and polysaccharide including water-soluble CMC. When water-soluble CMC and, optionally, other polysaccharides and CMC-Ca are added, these also may all be pre-powdered and mixed in a dry state and added to the cellulose all at once, or they may be added separately. A method of separate addition is preferred. This is because the cellulose composite can be made more highly functional by adjusting to a suitable shear rate and shear time in accordance with the blend amount and ratio of polysaccharides since the shear rate and shear time in the kneading step are important, as was mentioned above. For example, kneading at a rapid shear rate promotes size reduction and compositing of the cellulose, and subsequently kneading at a slow shear rate can develop the storage modulus. tan δ can also be kept low by establishing a long shear time in this instance.

When water-soluble CMC is added divided over multiple times and kneaded, water-soluble CMC of different degrees of substitution and viscosity may be premixed and added divided over multiple times, or water-soluble CMC may be categorized in accordance with the degree of substitution or viscosity and added separately by category. The method of addition divided by category is preferred. This is because the shear rate and time are easily optimized in accordance with the degree of substitution or viscosity of the water-soluble CMC. In addition, when added by category, the water-soluble CMC of one category may be added all at once or added divided over a number of times. The method of addition all at once is preferred in terms of making the work more efficient. Also, adding water-soluble CMC having a degree of substitution of 0.86-0.94, preferably 0.91-0.94, first, then adding water-soluble CMC having a higher degree of substitution is preferred as the order of addition. This is because water-soluble CMC of a lower degree of substitution is especially effective for size reduction and control of tan δ, while water-soluble CMC of a higher degree of substitution is especially effective for development of G'.

<Use of Cellulose Composite>

The cellulose composite of the present invention can be used in various foods and beverages. Examples include coffee, black tea, matcha, cocoa, sweet red bean soup, fruit juice, juice, and other such flavored beverages; raw milk, processed milk, lactic acid bacteria beverages, soy milk, and other such milky beverages; nutrient-fortified beverages fortifying calcium or protein or dietary fiber such as nuts or flour; health drinks, and various such beverages; ice cream, ice milk, soft cream, milk shake, sherbet, and other such frozen confections; butter, cheese, yoghurt, coffee whitener, whipped cream, custard cream, pudding, and other such dairy products; mayonnaise, margarine, spreads, shortening, and other such fats/oils processed foods; various soups, stews, sauces, dressings, and other such seasonings; various powdered spices typified by mustard pastes; various fillings typified by jams and flour paste; bean jam; gel and paste-like foods including gels; cereal food products including breads, noodles, pastas, pizzas, cereals, and various premixes; Western and Japanese sweets including candies, gummies, cookies, biscuits, chocolate, snack food, and rice crackers; marine product pastes typified by kamabokos and hanpens; livestock products typified by ham, sausage, steamed meat buns, shumai dumplings, and ground beef; cream croquettes, spring rolls, Chinese bean jam, gratins, dumplings, and various other prepared foods; delicacies such as salted fish, kimchi, pickled vegetables, and the like; pet foods; and parenteral liquid diets, and the like. Examples are not restricted as long as the item is ingested.

The cellulose composite of the present invention can be used as a suspension stabilizer, emulsion stabilizer, thickening stabilizer, foam stabilizer, clouding agent, texture-imparting agent, fluidity-improving agent, shape-retaining agent, water separation inhibitor, texture-modifying agent, powdered base, dietary fiber base, or a fat/oil substitute or other such low-calorie base in these uses.

When the cellulose composite of the present invention is blended into foods and beverages, each food or beverage may be prepared using commonly used methods and the same equipment to blend the main raw materials and, as needed, flavorings, pH regulators, thickening stabilizers, sugars, fats and oils, proteins, emulsifiers, acidulants, colorings, and the like and to conduct procedures such as mixing, kneading, stirring, emulsifying, heating, and the like.

<Amount of Cellulose Composite Added to Foods and Beverages>

The amount of cellulose composite added to foods and beverages is not particularly restricted; for example, preferably 0.01 mass % or higher in cocoa, coffee, milk beverages, and other such beverages. Setting the amount of cellulose composite added at 0.01 mass % or higher improves the dispersion, suspension stability, and emulsion stability. The more preferred amount added is 0.05 mass % or higher, even more preferably 0.1 mass % or higher. The upper limit is preferably 5 mass % or lower in terms of the drinking ease (throat passage, feel on tongue) of the beverage.

<Water-Insoluble Components>

The cellulose composite of the present invention can suppress the aggregation and separation of water-insoluble components contained in foods and beverages, especially beverages.

By "water-insoluble components" is meant components that disperse, float, or precipitate without dissolving when added to an aqueous medium and stirred. Examples include washed sesame or roasted sesame, rubbed sesame, hulled sesame, and other such sesames; grated fruits and vegetables such as radish, carrot, garlic, ginger, onion, potato, spinach, yam, green onion, shiitake mushroom, apple, pear, orange, lemon, and the like; and those that have been minced, those that are fibrous and have been dried and pulverized, and the like. Others include wheat, barley, rye, oats, adlay, and other such wheat varieties and rice, buckwheat, millet, corn, sorghum, foxtail millet, hemp, common millet, millet, and other such grains; soybeans, red beans, green beans, almonds, cashews, macadamia nuts, pistachios, hazelnuts, coconuts, pine nuts, walnuts, and other such nuts; kidney beans, fava beans, green soybeans, cacao beans, coffee beans, and other such legumes; pumpkin seeds, sunflower seeds, watermelon seeds, and other such seeds; or juices of citrus fruits such as citron, lemon, sudachi, kabosu, bitter orange, lime, tangerine, orange, and the like; fruit juices and fibers of other fruits; spices and herbs such as peppers; cocoa, calcium magnesium and other such minerals; turmeric, proteins (milk protein, soybean protein, whey, casein, and the like), collagen, coenzyme Q10, lactic acid bacteria and other such functional foods. The type of food or ingredients is not particularly restricted as long as they are water-insoluble components. These raw materials may or may not be treated by enzymes. In addition, the form may be a powder or paste, and the form is not restricted.

Cocoa, cereals, and legumes among them are preferred in consideration of the taste as a beverage.

<Water-Insoluble Component Content>

The water-insoluble component content in the beverage of the present invention is not particularly restricted; preferably 30 mass % or lower, more preferably 20 mass % or lower, and even more preferably 10 mass % or lower. As long as the amount of water-insoluble components is within this range, the flavor as a beverage is good, a balance of the network structure formed by the cellulose composite to the amount of cellulose composite added is easily obtained, and excellent suspension stability and a fluidizing effect are manifested readily.

In the food or beverage, preferably beverage, of the present invention, the occurrence of separation or aggregation can be suppressed even, for example, when a high concentration of 4 mass % or more of water-insoluble components is present in the food or beverage because it contains the cellulose composite of the present invention described above.

<Specific Gravity of Water-Insoluble Components>

The specific gravity of the water-insoluble components is preferably 1 g/cm$^3$ or higher. Precipitation is suppressed and uniform suspension stabilization is manifested in the liquid when the specific gravity is equal to or greater than that of water. The specific gravity is preferably 1.1 g/cm$^3$ or higher. The upper limit is preferably 3 g/cm$^3$ or lower in consideration of the size that can be suspension stabilized by the network formed by the cellulose composite and the ease of chewing when eating.

<Size of Water-Insoluble Components>

As the size of the water-insoluble components, the volume average particle diameter is preferably from 0.1 µm to 10 mm. As long as the volume average particle size is 10 mm or less, the balance is not disrupted since the water-insoluble components are not too large relative to the network formed by the cellulose composite, and the water-insoluble components do not precipitate since they are suspension stabilized. Also, as long as the volume average particle diameter is 0.1 µm or greater, the water-insoluble components are not too small relative to the network formed by the cellulose composite, and the water-insoluble components are caught in the network so that they do not precipitate or float. The volume average particle diameter of the water-insoluble components is preferably 1 µm or higher, even more preferably 5 µm or higher. The upper limit is more preferably 1 mm or lower, even more preferably 500 µm or lower.

Furthermore, the volume average particle diameter of the water-insoluble components in the present invention is the integrated 50% particle diameter in the volume frequency particle size distribution when a 1 mass % aqueous dispersion is measured by a laser diffraction/scattering particle size distribution analyzer (manufactured by Horiba, Ltd., product name "LA-910", included sonication function: 1 minute, refractive index: 1.20).

<Viscosity of Beverage>

The viscosity of a beverage of the present invention is preferably 100 mPa·s or lower. Here, the viscosity is the viscosity value measured at 25° C. by a Brookfield viscometer (manufactured by Toki Sangyo Co., Ltd., model TV-10) when stirred for 30 seconds at 60 rpm. The viscosity is more preferably 50 mPa·s or lower, even more preferably 20 mPa·s or lower, and especially preferably 10 mPa·s or lower. This is because a good texture when going down the throat can be maintained within this range. The lower limit is preferably 2 mPa·s or higher.

<Zeta Potential of Beverage>

The absolute value of the zeta potential of a beverage of the present invention is preferably 5 mV or higher, more preferably 10 mV or higher, even more preferably 20 mV or higher, and especially preferably 25 mV or higher. Negative values are also preferred. This is because the larger the absolute value of the zeta potential is, the less aggregation or precipitation there is in the beverage, and the more stably it is dispersed. For the zeta potential, a beverage that has been sonicated (manufactured by EYLA Inc., product name "AU-180C") for 10 minutes is measured using a zeta potential meter (manufactured by Otsuka Electronics Co., Ltd., product name "ELS-Z2") at 25° C., integration number: 20 times, refractive index of solvent: 1.33, dielectric constant of solvent: 78.3.

In addition, the absolute value of the zeta potential after the beverage of the present invention has been stored for one week at 40° C. is preferably 5 mV or higher, more preferably 10 mV or higher, even more preferably 20 mV or higher. There is little precipitation, aggregation, and separation even when stored standing under heated conditions when the absolute value of the zeta potential is high after being stored for one week at 40° C. Furthermore, the larger the absolute value of the zeta potential is, the higher the degree of stabilization can be said to be. Therefore, even though the upper limit of the absolute value is not particularly restricted, the absolute value of the zeta potential is preferably 100 mV or lower as long as the item is a beverage.

<Median Diameter of Particles in Beverage (Dynamic Light Scattering)>

The median diameter by dynamic light scattering of the particles dispersed in a beverage of the present invention is preferably 1000 nm or lower, more preferably 800 nm or lower, even more preferably 600 nm or lower, and especially preferably 500 nm or lower. This is because aggregation does not tend to be triggered in the beverage within this range. In measurement, a sample is diluted ten-fold by ion-exchanged water, and the beverage that has been sonicated (manufactured by EYLA Inc., product name "AU-180C") for 10 minutes is measured using a zeta potential meter (manufactured by Otsuka Electronics Co., Ltd., product name "ELS-Z2") at 25° C. and an integration number of 140 times.

EXAMPLES

The present invention is described below through examples. However, these examples in no way limit the scope of the present invention.

<Viscosity of Water-Soluble CMC>

Water-soluble CMC powder was measured out in an amount of 1 mass %, and ion-exchanged water was added to make a total of 300 g. This was dispersed for five minutes at 15,000 rpm using a high-shear homogenizer (manufactured by Nippon Seiki Co., Ltd., product name "Excel Autohomogenizer ED-7"). After standing for one hour at 25° C., a rotor was installed in a Brookfield viscometer (manufactured by Toki Sangyo Co., Ltd., product name "TV-10," rotor speed 60 rpm), the aqueous solution was allowed to stand for 60 seconds, then rotated for 30 seconds and measured. Furthermore, the optimum rotor was used in accordance with the viscosity.

<Storage Modulus G' of Cellulose Composite>

An aqueous dispersion obtained by dispersing 1 mass % of cellulose composite in ion-exchanged water using a high-shear homogenizer (manufactured by Nippon Seiki Co., Ltd., product name "Excel Autohomogenizer ED-7," treatment conditions: 15,000 rpm×5 minutes) was allowed to stand for one day at room temperature. The strain dependence of the stress of this aqueous dispersion was measured by a viscoelasticity measurement instrument (manufactured by Rheometric Scientific, Inc., model ARES G2, geometry: Double Wall Couette type, temperature: constant 25° C., angular velocity: 20 rad/sec, strain: sweep in the 1→794% direction; the aqueous dispersion was supplied slowly using an eyedropper so as not to destroy the microstructures, and measurement was begun in Dynamic Strain mode after allowing to stand for five minutes). The storage modulus in the present invention is the value of 20% strain at 25° C. on the strain-stress curve obtained by the above measurement.

<Tan δ of Cellulose Composite> tan δ was calculated using the following formula from the strain 20% value of the storage modulus (G') measured as described above and the loss modulus (G") measured simultaneously.

tan $S$=$G''$ (loss modulus)/$G'$ (storage modulus)

<Median Diameter of Cellulose Composite by Dynamic Light Scattering (DLS)>

An aqueous dispersion was produced by dispersing 0.01 mass % of cellulose composite in ion-exchanged water using a high-shear homogenizer (manufactured by Nippon Seiki Co., Ltd., product name "Excel Autohomogenizer ED-7," treatment conditions: 15,000 rpm×5 minutes). After sonicating the aqueous dispersion for 10 minutes by the apparatus included, it was measured by a zeta potential meter (manufactured by Otsuka Electronics Co., Ltd., product name "ELS-Z2"), and the particle diameter value corresponding to 50% scattering intensity integration in this particle size distribution was determined.

Example 1

Commercial dissolving pulp (DP) was chopped, then hydrolyzed for 15 minutes at 105° C. in 2.5 mol/L hydrochloric acid, then washed with water and filtered to produce wet-cake cellulose having a solids fraction of 55 mass %. The average degree of polymerization was 220.

Next, the wet-cake cellulose and commercial CMC-Na (manufactured by Ashland, FL-9A, degree of substitution 0.93) as water-soluble CMC were introduced into a twin-screw kneader (manufactured by DSM Xplore, Compounder 15) to make cellulose/water-soluble CMC=85/15 and a solids fraction concentration of 48 mass % (adjusted with ion-exchanged water) and wet-kneaded for 12 minutes at a shear rate of 393 (1/sec) to obtain a cellulose composite A. The water-soluble CMC was added all at once. The kneading temperature was 70° C.

The cellulose composite A obtained had a tan δ of 0.45, a storage modulus G' of 2.8 Pa, and DLS of 419 nm. The results are shown in Table 1.

Example 2

Wet-cake cellulose was produced in the same way as in Example 1. Next, the wet-cake cellulose and commercial CMC-Na (manufactured by Nippon Paper Industries Co., Ltd., FO4HC, degree of substitution 0.93) as water-soluble CMC were introduced into a twin-screw kneader (manufactured by DSM Xplore, Compounder 15) to make cellulose/water-soluble CMC=89/11 and a solids fraction concentration of 48 mass % (adjusted with ion-exchanged water) and wet-kneaded for 10 minutes at a shear rate of 785 (1/sec) to obtain a cellulose composite B.

The cellulose composite B obtained had a tan δ of 0.46, a storage modulus G' of 2.0 Pa, and DLS of 255 nm. The results are shown in Table 1.

Example 3

Wet-cake cellulose was produced in the same way as in Example 1. Next, the wet-cake cellulose, commercial CMC-Na (manufactured by Ashland, FL-9A, degree of substitution 0.93) as water-soluble CMC, and commercial CMC-Ca (manufactured by Gotoku Chemical Co., Ltd., ECG) as water-insoluble CMC were introduced into a twin-screw kneader (manufactured by DSM Xplore, Compounder 15) to make cellulose/CMC=89/11 (cellulose/CMC-Na/CMC-Ca=89/10/1) and a solids fraction concentration of 48 mass % (adjusted with ion-exchanged water) and wet-kneaded for 10 minutes at a shear rate of 785 (1/sec) to obtain a cellulose composite C.

The cellulose composite C obtained had a tan δ of 0.41, a storage modulus G' of 2.7 Pa, and DLS of 328 nm. The results are shown in Table 1.

Example 4

Wet-cake cellulose was produced in the same way as in Example 1. Next, the wet-cake cellulose and commercial CMC-Na (manufactured by Ashland, FL-9A, degree of substitution 0.93) as water-soluble CMC were introduced into a twin-screw kneader (manufactured by DSM Xplore, Compounder 15) to make cellulose/water-soluble CMC=94/6 and a solids fraction concentration of 48 mass % (adjusted with ion-exchanged water) and wet-kneaded for 24 minutes at a shear rate of 1193 (1/sec) to obtain a cellulose composite D.

The cellulose composite D obtained had a tan δ of 0.57, a storage modulus G' of 0.7 Pa, and DLS of 355 nm. The results are shown in Table 1.

Example 5

Wet-cake cellulose was produced in the same way as in Example 1. Next, the wet-cake cellulose and commercial CMC-Na (manufactured by Ashland, 12M31F, degree of substitution 1.2) as water-soluble CMC were introduced into a twin-screw kneader (manufactured by DSM Xplore, Compounder 15) to make cellulose/water-soluble CMC=90/10 and a solids fraction concentration of 46 mass % (adjusted with ion-exchanged water) and wet-kneaded for 38 minutes at a shear rate of 785 (1/sec) to obtain a cellulose composite G.

The cellulose composite G obtained had a tan δ of 0.51, a storage modulus G' of 2.0 Pa, and DLS of 349 nm. The results are shown in Table 1.

Example 6

Wet-cake cellulose was produced in the same way as in Example 1. Next, the wet-cake cellulose and commercial CMC-Na (manufactured by Daicel Co., Ltd., 1330, degree of substitution 1.3) as water-soluble CMC were introduced into a twin-screw kneader (manufactured by DSM Xplore, Compounder 15) to make cellulose/water-soluble CMC=85/15 and a solids fraction concentration of 47 mass % (adjusted with ion-exchanged water) and kneaded to obtain a cellulose composite I. The CMC-Na was added divided over two times in this instance. Of the 15 mass % proportion of water-soluble CMC in the total with cellulose, a 10 mass % fraction was first wet-kneaded together with the cellulose for 30 minutes at a shear rate of 785 (1/sec), and the remaining 5 mass % fraction was then added, and the kneaded material was wet-kneaded for another eight minutes at a shear rate of 785 (1/sec).

The cellulose composite I obtained had a tan δ of 0.47, a storage modulus G' of 3.8 Pa, and DLS of 493 nm. The results are shown in Table 2.

Example 7

Wet-cake cellulose was produced in the same way as in Example 1. Next, the wet-cake cellulose and commercial CMC-Na (manufactured by Ashland, FL-9A, degree of substitution 0.93 and manufactured by Ashland, Amburger 1221, degree of substitution 1.3) as water-soluble CMC were introduced into a twin-screw kneader (manufactured by DSM Xplore, Compounder 15) to make cellulose/water-soluble CMC=81/19 and a solids fraction concentration of 47 mass % (adjusted with ion-exchanged water) and kneaded to obtain a cellulose composite J. The CMC-Na was added divided over two times in this instance. Of the 19 mass % proportion of water-soluble CMC in the total with cellulose, a 14 mass % fraction was FL-9A and a 5 mass % fraction was Amburger 1221. First, 14 mass % of FL-9A was wet-kneaded together with 81 mass % of cellulose for 10 minutes at a shear rate of 785 (1/sec), then 5 mass % of Amburger 1221 was added, and the kneaded material was wet-kneaded for another eight minutes at a shear rate of 628 (1/sec).

The cellulose composite J obtained had a tan δ of 0.42, a storage modulus G' of 3.2 Pa, and DLS of 418 nm. The results are shown in Table 2.

Example 8

Wet-cake cellulose was produced in the same way as in Example 1. Next, the wet-cake cellulose, commercial CMC-Na (manufactured by Ashland, FL-9A, degree of substitution 0.93 and manufactured by Daicel Co., Ltd., 1330, degree of substitution 1.3) as water-soluble CMC, and commercial CMC-Ca (manufactured by Gotoku Chemical Co., Ltd., ECG) as water-insoluble CMC were introduced into a twin-screw kneader (manufactured by DSM Xplore, Compounder 15) to make cellulose/CMC=83/17 (cellulose/CMC-Na/CMC-Ca=83/15/2) and a solids fraction concentration of 47 mass % (adjusted with ion-exchanged water) and kneaded to obtain a cellulose composite K. The CMC was added divided over two times in this instance. Of the 17 mass % proportion of CMC in the total with cellulose, a 10 mass % fraction was FL-9A, a 5 mass % fraction was 1330, and a 2 mass % fraction was CMC-Ca. First, 10 mass % of FL-9A and 2 mass % of CMC-Ca were wet-kneaded together with 83 mass % of cellulose for 26 minutes at a shear rate of 1193 (1/sec), then 5 mass % of 1330 was added, and the kneaded material was wet-kneaded for another 19 minutes at a shear rate of 393 (1/sec).

The cellulose composite K obtained had a tan δ of 0.37, a storage modulus G' of 3.8 Pa, and DLS of 365 nm. The results are shown in Table 2.

Example 9

Wet-cake cellulose was produced in the same way as in Example 1. Next, the wet-cake cellulose, commercial CMC-Na (manufactured by Ashland, FL-9A, degree of substitution 0.93 and manufactured by Daicel Co., Ltd., 1330, degree of substitution 1.3) as water-soluble CMC, and commercial CMC-Ca (manufactured by Gotoku Chemical Co., Ltd., ECG) as water-insoluble CMC were introduced into a twin-screw kneader (manufactured by DSM Xplore, Compounder 15) to make cellulose/CMC=83/17 (cellulose/CMC-Na/CMC-Ca=83/15/2) and a solids fraction concentration of 47 mass % (adjusted with ion-exchanged water) and kneaded to obtain a cellulose composite L. The CMC was added divided over three times in this instance. Of the 17 mass % proportion of CMC in the total with cellulose, a 10 mass % fraction was FL-9A, a 5 mass % fraction was 1330, and a 2 mass % fraction was CMC-Ca. First, 7 mass % of FL-9A and 2 mass % of CMC-Ca were wet-kneaded together with 83 mass % of cellulose for 13 minutes at a shear rate of 1193 (1/sec), then 3 mass % of FL-9A was added and wet-kneaded for another 13 minutes while maintaining the shear rate, and then 5 mass % of 1330 was added, and the kneaded material was wet-kneaded for another 19 minutes at a shear rate of 393 (1/sec).

The cellulose composite L obtained had a tan δ of 0.38, a storage modulus G' of 3.5 Pa, and DLS of 389 nm. The results are shown in Table 2.

Comparative Example 1

Wet-cake cellulose was produced in the same way as in Example 1. Next, the wet-cake cellulose and commercial CMC-Na (manufactured by Ashland, FL-9A) as water-soluble CMC were introduced into a twin-screw kneader (manufactured by DSM Xplore, Compounder 15) to make cellulose/water-soluble CMC=40/60 and a solids fraction concentration of 45 mass % (adjusted with ion-exchanged water) and wet-kneaded for 30 minutes at a shear rate of 785 (1/sec) to obtain a cellulose composite M.

The cellulose composite M obtained had a tan δ of 2.5, a storage modulus G' of 2.3 Pa, and DLS of 1153 nm. The results are shown in Table 3.

Comparative Example 2

Wet-cake cellulose was produced in the same way as in Example 1. Next, the wet-cake cellulose and commercial CMC-Na (manufactured by Daicel Co., Ltd., 1330) as water-soluble CMC were introduced into a twin-screw kneader (manufactured by DSM Xplore, Compounder 15) to make cellulose/water-soluble CMC=85/15 and a solids fraction concentration of 47 mass % (adjusted with ion-exchanged water) and kneaded to obtain a cellulose composite O. The CMC was added divided over two times in this instance. Of the 15 mass % proportion of water-soluble CMC in the total with cellulose, a 10 mass % fraction of 1330 was first wet-kneaded together with the cellulose for 30 minutes at a shear rate of 785 (1/sec). The kneaded material was then removed and divided into 5 mm² portions, placed in a polyethylene bag with a chuck, and the remaining 5 mass % fraction of 1330 was added, and mixed by shaking the bag by hand for three minutes.

The cellulose composite O obtained had a tan δ of 0.73, a storage modulus G' of 1.5 Pa, and DLS of 832 nm. The results are shown in Table 3. Part of the CMC was merely sprinkled on, without being kneaded in, making the tan δ large, lowering G', and increasing the median diameter.

Comparative Example 3

Wet-cake cellulose was produced in the same way as in Example 1. Next, the wet-cake cellulose, commercial CMC-Na (manufactured by Ashland, 12M31F, viscosity in a 2 mass % aqueous solution 480 mPa·s) as water-soluble CMC, and commercial CMC-Na (manufactured by Ashland, Amburgum 1221, viscosity in a 2 mass % aqueous solution 45 mPa·s) as water-soluble CMC were introduced into a twin-screw kneader (manufactured by DSM Xplore, Compounder 15) to make cellulose/water-soluble CMC=92/8 and a solids fraction concentration of 48 mass % (adjusted with ion-exchanged water), and a cellulose composite P was obtained. In this instance, the 12M31F/Amburgum 1221 were blended to make 1/3 (mass ratio), the water-soluble CMC was added to the cellulose once at the beginning and wet-kneaded at a shear rate of 785 (1/sec) for 30 minutes.

The cellulose composite P obtained had a tan δ of 0.62, a storage modulus G' of 3.8 Pa, and DLS of 653 nm. The results are shown in Table 3.

Comparative Example 4

Wet-cake cellulose was produced in the same way as in Example 1. Next, the wet-cake cellulose and commercial CMC-Na (manufactured by Ashland, 7LF) as water-soluble CMC were introduced into a twin-screw kneader (manufactured by DSM Xplore, Compounder 15) to make cellulose/water-soluble CMC=85/10 (mass ratio) and a solids fraction concentration of 46 mass % (adjusted with ion-exchanged water), and kneaded for six minutes at a shear rate of 785 (1/sec). The product was dispersed in water, 5 mass % of commercial CMC-Na (manufactured by Ashland, 12M31F), which is a water-soluble CMC, was added (the total of cellulose and water-soluble CMC was taken to be 100 mass %), and mixed for 10 minutes at 500 rpm by a three-one motor. The product was dried by a spray dryer, and a powdered cellulose composite Q was obtained.

The cellulose composite Q obtained had a tan δ of 1.39, a storage modulus G' of 0.37 Pa, and DLS of 452 nm. The results are shown in Table 3.

Comparative Example 5

Wet-cake cellulose was produced in the same way as in Example 1. Next, the wet-cake cellulose and commercial CMC-Na (manufactured by Ashland, 7LF) as water-soluble CMC were introduced into a twin-screw kneader (manufactured by DSM Xplore, Compounder 15) to make cellulose/water-soluble CMC=85/15 and a solids fraction concentration of 45 mass % (adjusted with ion-exchanged water) and wet-kneaded for 13 minutes at a shear rate of 785 (1/sec) to obtain a cellulose composite R.

The cellulose composite R obtained had a tan δ of 1.54, a storage modulus G' of 0.37 Pa, and DLS of 319 nm. The results are shown in Table 3.

Comparative Example 6

Wet-cake cellulose was produced in the same way as in Example 1. Next, the wet-cake cellulose and commercial CMC-Na (manufactured by Ashland, 7LF) as water-soluble CMC were mixed for 10 minutes at 500 rpm using a three-one motor at cellulose/water-soluble CMC=85/10 and a solids fraction concentration of 10 mass % (adjusted with ion-exchanged water). The product was homogenized at 15 MPa using a piston-type homogenizer (manufactured by APV, Manton-Gaulin homogenizer). A quantity of 5 mass % of commercial CMC-Na (manufactured by Ashland, 12M31F) was added to the product (the total of cellulose and water-soluble CMC was taken to be 100 mass %), and mixed for 10 minutes at 500 rpm using a three-one motor. The product was homogenized using a piston-type homogenizer, and a cellulose composite S was obtained.

The cellulose composite S obtained had a tan δ of 1.86, a storage modulus G' of 0.31 Pa, and DLS of 1237 nm. The results are shown in Table 4.

Comparative Example 7

Wet-cake cellulose was produced in the same way as in Example 1. Next, the wet-cake cellulose and commercial CMC-Na (manufactured by Ashland, FL-9A, degree of substitution 0.93 and manufactured by Ashland, Amburger 1221, degree of substitution 1.3) as water-soluble CMC were introduced into a twin-screw kneader (manufactured by DSM Xplore, Compounder 15) to make cellulose/water-soluble CMC=81/19 and a solids fraction concentration of 46 mass % (adjusted with ion-exchanged water) and kneaded to obtain a cellulose composite T. The CMC-Na was added divided over two times in this instance. Of the 19 mass % proportion of water-soluble CMC in the total with cellulose, a 14 mass % fraction of FL-9A was wet-kneaded together with the cellulose for 30 minutes at a shear rate of 141 (1/sec). The Amburger 1221, which was the remaining 5 mass %, was then added, and the kneaded material was wet-kneaded for another 10 minutes at a shear rate of 141 (1/sec).

The cellulose composite T obtained had a tan δ of 1.58, a storage modulus G' of 0.64 Pa, and DLS of 948 nm. The results are shown in Table 4.

Comparative Example 8

Wet-cake cellulose was produced in the same way as in Example 1. Next, the wet-cake cellulose and commercial CMC-Na (manufactured by Daicel Co., Ltd., 1330, degree of substitution 1.3) as water-soluble CMC were introduced into a twin-screw kneader (manufactured by DSM Xplore, Compounder 15) to make cellulose/water-soluble CMC=85/15 and a solids fraction concentration of 10 mass % (adjusted with ion-exchanged water) and kneaded to obtain a cellulose composite U. The CMC-Na was added divided over two times in this instance. Of the 15 mass % proportion of water-soluble CMC in the total with cellulose, a 10 mass % fraction was wet-kneaded together with the cellulose for 30 minutes at a shear rate of 785 (1/sec). The remaining 5 mass % fraction was then wet-kneaded for another 30 minutes at a shear rate of 785 (1/sec).

The cellulose composite U obtained had a tan δ of 2.1, a storage modulus G' of 0.41 Pa, and DLS of 1550 nm. The results are shown in Table 4.

<Evaluation of Cocoa Beverage>

Cocoa beverages were produced by the following procedure using the cellulose composites obtained in the above examples and comparative examples, and evaluated. A premixed powder of 40 grams of cocoa powder, 320 g of sugar, 200 g of skim milk, and 8 g of cellulose composite was added to ion-exchanged water that had been warmed to 80° C. to make a total of 4000 g, and stirred and mixed for 10 minutes by a three-one motor (manufactured by HEIDON, BL-600, cross-shaped blades). The product was homogenized at 15 MPa using a piston-type homogenizer (manufactured by APV, Manton-Gaulin homogenizer). The product was UHT sterilized for 60 seconds at 140° C., placed in 350 mL PET bottles and capped, allowed to stand upright at temperatures of 25° C., 40° C., and 50° C., and stored for one month. The state of separation, aggregation, and precipitation was examined visually after the end of the storage period. The results of evaluation appear in Tables 1-4. The evaluation criteria are shown below.

<Evaluation of Peanut Milk Beverage>

Peanut milk beverages were produced by the following procedure using the cellulose composites obtained in the above examples and comparative examples, and evaluated. A premixed powder of 240 grams of sugar, 160 g of peanut powder, 200 g of skim milk, 8 g of casein sodium, and 8 g of cellulose composite was added to ion-exchanged water that had been warmed to 75° C. to make a total of 4000 g, and stirred and mixed for 10 minutes by a three-one motor (manufactured by HEIDON, BL-600, cross-shaped blades). The product was stirred for 10 minutes at 10,000 rpm using a TK homogenizer (manufactured by SMT), then homogenized at 20 MPa using a piston-type homogenizer (manufactured by APV, Manton-Gaulin homogenizer). The product was UHT sterilized for five seconds at 140° C., placed in 350 mL PET bottles and capped, allowed to stand upright at temperatures of 25° C., 40° C., and 50° C., and stored for one month. The state of separation, aggregation, and precipitation was examined visually after the end of the storage period. The results of evaluation appear in Tables 1-4. The evaluation criteria are shown below.

<Evaluation of Beverages>

The suspension stability after one month of storage in an incubator at 25° C., 40° C., or 50° C. was evaluated as following using three parameters: separation, aggregation, and precipitation.

—Separation—

⊙: no separation (meaning a state in which the upper part and lower part are separated into two layers of different colors when viewed from the side), ○: height of separated upper layer 1-10% of entire sample, Δ: height of separated upper layer 11-30% of entire sample, x: height of separated upper layer 31% or more of entire sample —Aggregation—

⊙: no aggregation when viewed from side (homogeneous), ○: aggregation occurred in an area of less than 20% when viewed from the side, Δ: aggregation occurred in an area from 20% to less than 50% when viewed from the side, x: aggregation occurred in an area of 50% or more when viewed from the side —Precipitation—

⊙: No precipitation when viewed from the bottom (homogeneous), ○: precipitation occurred in an area of less than 20% when viewed from the bottom, Δ: precipitation occurred in an area from 20% to less than 80% when viewed from the bottom, x: aggregation occurred in an area of 80% or more when viewed from the bottom <Zeta Potential of Beverage>

The zeta potential of the beverage was measured at 25° C. after the beverage had been stored standing for one week at 40° C. The zeta potential of a beverage that had been sonicated (manufactured by EYLA, product name "AU-180C") for 10 minutes was measured using a zeta potential meter (manufactured by Otsuka Electronics Co., Ltd., product name "ELS-Z2") at 25° C., integration number: 20 times, refractive index of solvent: 1.33, dielectric constant of solvent: 78.3, and categorized as follows.

⊙: absolute value of zeta potential 20 mV or higher, ○: absolute value of zeta potential from 10 to less than 20 mV, Δ: absolute value of zeta potential from 5 to less than 10 mV, x: absolute value of zeta potential less than 5 mV

TABLE 1

| Parameter | Parameter | Unit | Example 1 | Example 2 | Example 3 | Example 4 | Example 5 |
| --- | --- | --- | --- | --- | --- | --- | --- |
| Composition | MCC | [mass %] | 85 | 89 | 89 | 94 | 90 |
| | CMC-Na | [mass %] | 15 | 11 | 10 | 6 | 10 |
| | CMC-Ca | [mass %] | 0 | 0 | 1 | 0 | 0 |
| | Addition no. | [times] | 1 time | 1 time | 1 time | 1 time | 1 time |

TABLE 1-continued

| Parameter | Parameter | Unit | Example 1 | Example 2 | Example 3 | Example 4 | Example 5 |
|---|---|---|---|---|---|---|---|
| CMC-Na | Viscosity | [mPa·s] | 15 | 16 | 15 | 15 | 58 |
|  | Degree of substitution | [—] | 0.93 | 0.93 | 0.93 | 0.93 | 1.2 |
| CMC-Ca | Viscosity | [mPa·s] | — | — | 2 | — | — |
|  | Degree of substitution | [—] | — | — | 0.61 | — | — |
| Compositing step | Solids fraction concentration | [mass %] | 48 | 48 | 48 | 48 | 46 |
|  | Shear rate | [1/sec] | 393 | 785 | 785 | 1193 | 785 |
|  | Shear time | [min] | 12 | 10 | 10 | 24 | 38 |
| Properties | tan δ | [—] | 0.51 | 0.46 | 0.41 | 0.57 | 0.51 |
|  | G' | [Pa] | 2.8 | 2.0 | 2.7 | 0.7 | 2.0 |
|  | DLS | [nm] | 419 | 255 | 328 | 355 | 349 |
| Cocoa beverage | 25° C. | Separation | ⊙ | ⊙ | ⊙ | ○ | ○ |
|  |  | Aggregation | ○ | ○ | ○ | ○ | ○ |
|  |  | Precipitation | ⊙ | ○ | ⊙ | Δ | Δ |
|  | 40° C. | Separation | ○ | ○ | ⊙ | ○ | ○ |
|  |  | Aggregation | ○ | ○ | ○ | Δ | Δ |
|  |  | Precipitation | ⊙ | ○ | ⊙ | ○ | ⊙ |
|  | 50° C. | Separation | Δ | ○ | ⊙ | ○ | ○ |
|  |  | Aggregation | Δ | Δ | ○ | Δ | Δ |
|  |  | Precipitation | ○ | Δ | ○ | Δ | ○ |
|  | Zeta potential | — | — | Δ | ○ | ○ | Δ | ○ |
| Peanut milk beverage | 25° C. | Separation | ⊙ | ○ | ○ | ⊙ | ⊙ |
|  |  | Aggregation | ○ | ○ | ⊙ | ○ | ○ |
|  |  | Precipitation | ○ | ○ | ○ | Δ | Δ |
|  | 40° C. | Separation | ○ | ○ | ○ | ○ | ○ |
|  |  | Aggregation | ○ | ○ | ⊙ | Δ | Δ |
|  |  | Precipitation | ⊙ | ○ | ⊙ | Δ | ○ |
|  | 50° C. | Separation | Δ | ○ | ○ | ○ | ○ |
|  |  | Aggregation | Δ | Δ | ⊙ | Δ | Δ |
|  |  | Precipitation | ○ | ○ | ⊙ | Δ | ○ |
|  | Zeta potential | — | — | Δ | ○ | ○ | Δ | Δ |

TABLE 2

| Parameter | Parameter | Unit | Example 6 | Example 7 | Example 8 | Example 9 |
|---|---|---|---|---|---|---|
| Composition | MCC | [mass %] | 85 | 81 | 83 | 83 |
|  | CMC-Na | [mass %] | 15 | 19 | 15 | 15 |
|  | CMC-Ca | [mass %] | 0 | 0 | 2 | 2 |
|  | Addition no. | [times] | 2 times | 2 times | 2 times | 3 times |
| CMC-Na | (1) Viscosity | [mPa·s] | 21 | 15 | 15 | 15 |
|  | (1) Degree of substitution | [—] | 1.3 | 0.93 | 0.93 | 0.93 |
|  | (2) Viscosity | [mPa·s] | — | 10 | 21 | 15 |
|  | (2) Degree of substitution | [—] | — | 1.3 | 1.3 | 0.93 |
|  | (3) Viscosity | [mPa·s] | — | — | — | 21 |
|  | (3) Degree of substitution | [—] | — | — | — | 1.3 |
| CMC-Ca | Viscosity | [mPa·s] | — | — | 2 | 2 |
|  | Degree of substitution | [—] | — | — | 0.61 | 0.61 |
| Compositing step | Solids fraction concentration | [mass %] | 47 | 47 | 47 | 47 |
|  | (1) Shear rate | [1/sec] | 785 | 785 | 1193 | 1193 |
|  | (1) Shear time | [min] | 30 | 10 | 26 | 13 |
|  | (2) Shear rate | [1/sec] | 785 | 628 | 393 | 1193 |
|  | (2) Shear time | [min] | 8 | 8 | 19 | 13 |
|  | (3) Shear rate | [1/sec] | — | — | — | 393 |
|  | (3) Shear time | [min] | — | — | — | 19 |
| Properties | tan δ | [—] | 0.47 | 0.42 | 0.37 | 0.38 |
|  | G' | [Pa] | 3.8 | 3.2 | 3.8 | 3.5 |
|  | DLS | [nm] | 493 | 453 | 365 | 389 |
| Cocoa beverage | 25° C. | Separation | ○ | ⊙ | ⊙ | ⊙ |
|  |  | Aggregation | ○ | ⊙ | ⊙ | ⊙ |
|  |  | Precipitation | ⊙ | ⊙ | ⊙ | ⊙ |
|  | 40° C. | Separation | Δ | ⊙ | ⊙ | ⊙ |
|  |  | Aggregation | ○ | ○ | ⊙ | ⊙ |
|  |  | Precipitation | ⊙ | ⊙ | ⊙ | ⊙ |
|  | 50° C. | Separation | Δ | ⊙ | ⊙ | ○ |
|  |  | Aggregation | Δ | ○ | ⊙ | ⊙ |
|  |  | Precipitation | ⊙ | ⊙ | ⊙ | ⊙ |
|  | Zeta potential | — | Δ | ○ | ⊙ | ⊙ |
| Peanut milk beverage | 25° C. | Separation | ○ | ⊙ | ⊙ | ⊙ |
|  |  | Aggregation | ○ | ⊙ | ⊙ | ⊙ |
|  |  | Precipitation | ⊙ | ⊙ | ⊙ | ⊙ |

TABLE 2-continued

| Parameter | Parameter | Unit | Example 6 | Example 7 | Example 8 | Example 9 |
|---|---|---|---|---|---|---|
| | 40° C. | Separation | ○ | ⊙ | ⊙ | ⊙ |
| | | Aggregation | Δ | ○ | ⊙ | ⊙ |
| | | Precipitation | ⊙ | ○ | ⊙ | ⊙ |
| | 50° C. | Separation | ○ | ⊙ | ⊙ | ⊙ |
| | | Aggregation | Δ | ○ | ⊙ | ⊙ |
| | | Precipitation | ⊙ | ○ | ⊙ | ⊙ |
| | Zeta potential | — | — | ○ | ⊙ | ⊙ |

TABLE 3

| Parameter | Parameter | Unit | Comparative Example 1 | Comparative Example 2 | Comparative Example 3 | Comparative Example 4 | Comparative Example 5 |
|---|---|---|---|---|---|---|---|
| Composition | MCC | [mass %] | 40 | 85 | 92 | 85 | 85 |
| | CMC-Na | [mass %] | 60 | 15 | 8 | 15 | 15 |
| | CMC-Ca | [mass %] | 0 | 0 | 0 | 0 | 0 |
| | Addition no. | [times] | 1 time | 2 times | 1 time | 2 times | 1 time |
| CMC-Na | (1) Viscosity | [mPa·s] | 15 | 21 | (480) | 5 | 5 |
| | (1) Degree of substitution | [—] | 0.93 | 1.3 | 1.2 | 0.72 | 0.72 |
| | (2) Viscosity | [mPa·s] | — | 21 | (45) | 58 | — |
| | (2) Degree of substitution | [—] | — | 1.3 | 1.3 | 1.2 | — |
| CMC-Ca | Viscosity | [mPa·s] | — | — | — | — | — |
| | Degree of substitution | [—] | — | — | — | — | — |
| Compositing step | Solids fraction concentration | [mass %] | 45 | 47 | 48 | 46 | 45 |
| | (1) Shear rate | [1/sec] | 785 | 785 | 785 | 785 | 785 |
| | (1) Shear time | [min] | 30 | 30 | 30 | 6 | 13 |
| | (2) Shear rate | [1/sec] | — | 0 | — | — | — |
| | (2) Shear time | [min] | — | 0 | — | 10 | — |
| Properties | tan δ | [—] | 2.5 | 0.73 | 0.62 | 1.39 | 1.54 |
| | G' | [Pa] | 2.3 | 1.5 | 3.8 | 0.37 | 0.37 |
| | DLS | [nm] | 1153 | 832 | 653 | 452 | 319 |
| Cocoa beverage | 25° C. | Separation | X | X | Δ | ○ | ⊙ |
| | | Aggregation | X | X | X | X | X |
| | | Precipitation | ○ | X | ⊙ | X | X |
| | 40° C. | Separation | X | X | X | Δ | ⊙ |
| | | Aggregation | X | X | X | X | X |
| | | Precipitation | ○ | Δ | ⊙ | X | X |
| | 50° C. | Separation | X | X | X | X | ○ |
| | | Aggregation | X | X | X | Δ | X |
| | | Precipitation | ○ | Δ | ⊙ | X | X |
| | Zeta potential | — | — | X | X | X | X | Δ |
| Peanut milk beverage | 25° C. | Separation | X | X | X | ○ | ⊙ |
| | | Aggregation | X | X | X | X | X |
| | | Precipitation | ○ | X | ⊙ | X | X |
| | 40° C. | Separation | X | X | X | ○ | ⊙ |
| | | Aggregation | X | X | X | X | X |
| | | Precipitation | ○ | Δ | ⊙ | X | X |
| | 50° C. | Separation | X | X | X | Δ | ○ |
| | | Aggregation | X | X | X | Δ | X |
| | | Precipitation | ○ | Δ | ⊙ | X | X |
| | Zeta potential | — | — | X | X | X | X | ○ |

TABLE 4

| Parameter | Parameter | Unit | Comparative Example 6 | Comparative Example 7 | Comparative Example 8 |
|---|---|---|---|---|---|
| Composition | MCC | [mass %] | 85 | 81 | 85 |
| | CMC | [mass %] | 15 | 19 | 15 |
| | CMC-Na | [mass %] | 15 | 15 | 15 |
| | CMC-Ca | [mass %] | 0 | 0 | 0 |
| | Addition no. | [times] | 2 times | 2 times | 2 times |
| CMC-Na | (1) Viscosity | [mPa·s] | 5 | 15 | 21 |
| | (1) Degree of substitution | [—] | 0.72 | 0.93 | 1.3 |
| | (2) Viscosity | [mPa·s] | 58 | 10 | — |
| | (2) Degree of substitution | [—] | 1.2 | 1.3 | — |

TABLE 4-continued

| Parameter | Parameter | Unit | Comparative Example 6 | Comparative Example 7 | Comparative Example 8 |
|---|---|---|---|---|---|
| CMC-Ca | Viscosity | [mPa · s] | — | — | — |
|  | Degree of substitution | [—] | — | — | — |
| Compositing step | Solids fraction concentration | [mass %] | 10 | 46 | 10 |
|  | (1) Shear rate | [1/sec] | — | 141 | 785 |
|  | (1) Shear time | [min] | — | 30 | 30 |
|  | (2) Shear rate | [1/sec] | — | 141 | 785 |
|  | (2) Shear time | [min] | — | 10 | 30 |
| Properties | tan δ | [—] | 1.86 | 1.58 | 2.1 |
|  | G' | [Pa] | 0.31 | 0.64 | 0.41 |
|  | DLS | [nm] | 1237 | 948 | 1550 |
| Cocoa beverage | 25° C. | Separation | Δ | X | X |
|  |  | Aggregation | X | Δ | X |
|  |  | Precipitation | X | X | X |
|  | 40° C. | Separation | Δ | X | X |
|  |  | Aggregation | X | Δ | X |
|  |  | Precipitation | X | X | X |
|  | 50° C. | Separation | X | X | X |
|  |  | Aggregation | Δ | Δ | X |
|  |  | Precipitation | X | X | X |
|  | Zeta potential |  | — | X | X | X |
| Peanut milk beverage | 25° C. | Separation | Δ | X | X |
|  |  | Aggregation | X | ○ | X |
|  |  | Precipitation | X | X | X |
|  | 40° C. | Separation | Δ | X | X |
|  |  | Aggregation | X | Δ | X |
|  |  | Precipitation | X | X | X |
|  | 50° C. | Separation | Δ | X | X |
|  |  | Aggregation | X | Δ | X |
|  |  | Precipitation | X | X | X |
|  | Zeta potential | — | X | Δ | X |

The invention claimed is:

1. A cellulose composite comprising cellulose and one or more types of water-soluble carboxymethyl cellulose wherein tan δ of an aqueous dispersion obtained by dispersing 1 mass % of the cellulose composite in ion-exchanged water is 0.60 or lower, wherein storage modulus (G') is 2 Pa or higher in an aqueous dispersion containing 1 mass % of the cellulose composite in ion-exchanged water.

2. The cellulose composite of claim 1 wherein median diameter according to dynamic light scattering is 600 nm or lower in an aqueous dispersion containing 0.01 mass % of the cellulose composite in ion-exchanged water.

3. The cellulose composite of claim 1 wherein the water-soluble carboxymethyl cellulose blended in the cellulose composite comprises at least one or more types of carboxymethyl cellulose sodium.

4. The cellulose composite of claim 1 further comprising one or more types of carboxymethyl cellulose calcium.

5. The cellulose composite of claim 1 wherein at least one type of the water-soluble carboxymethyl cellulose is water-soluble carboxymethyl cellulose having a degree of substitution in a range of 0.86-0.94.

6. A method for producing a cellulose composite comprising cellulose and water-soluble carboxymethyl cellulose, the cellulose composite being as defined in claim 1, wherein the method comprises a first kneading step of kneading a first water-soluble carboxymethyl cellulose and cellulose and a second kneading step of adding a second water-soluble carboxymethyl cellulose thereto and kneading, and wherein wet kneading is conducted at a shear rate of 300 (1/s) or higher in the first kneading step, wherein kneading is conducted at a shear rate of 1000 (1/s) or lower in the second kneading step, and wherein solids fraction during kneading is set at 20 mass % or higher.

7. The method for producing a cellulose composite of claim 6 wherein the water-soluble carboxymethyl cellulose used in the first kneading step comprises one or more types of water-soluble carboxymethyl cellulose sodium having a degree of substitution in a range of 0.86-0.94.

8. The method for producing a cellulose composite of claim 6 wherein the first water-soluble carboxymethyl cellulose and the second water-soluble carboxymethyl cellulose are the same.

9. A food or beverage comprising the cellulose composite of claim 1.

10. A beverage comprising the cellulose composite of claim 1 and a water-insoluble component, the beverage having an absolute value of zeta potential after one week of storage at 40° C. of 10 mV or higher.

11. The beverage of claim 10 wherein the water-insoluble component comprises any of cocoa, cereals, or legumes.

* * * * *